United States Patent
Balugari et al.

(10) Patent No.: US 11,010,703 B2
(45) Date of Patent: May 18, 2021

(54) PRODUCTIVITY MEASUREMENT, MODELING AND ILLUSTRATION SYSTEM

(71) Applicant: Accenture Global Solutions Limited, Dublin (IE)

(72) Inventors: Sunil Balugari, Bangalore (IN); Ramesh K. V., Bangalore (IN); Kallol Basu, West Bengal (IN); Satyendra Shinde, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1079 days.

(21) Appl. No.: 15/223,073

(22) Filed: Jul. 29, 2016

(65) Prior Publication Data
US 2017/0308837 A1   Oct. 26, 2017

(30) Foreign Application Priority Data

Apr. 25, 2016   (IN) .............................. 201641014389

(51) Int. Cl.
*G06Q 10/06* (2012.01)
*G06T 11/20* (2006.01)
*G06F 3/0484* (2013.01)

(52) U.S. Cl.
CPC ... *G06Q 10/06393* (2013.01); *G06F 3/04847* (2013.01); *G06T 11/206* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 2002/0062594 A1* | 5/2002 | Erickson | ................ | A01G 15/00 |
| | | | | 47/48.5 |
| 2008/0177836 A1* | 7/2008 | Bennett | ................... | H04L 67/02 |
| | | | | 709/205 |
| 2009/0157468 A1* | 6/2009 | Alappatt | ................ | G06Q 10/10 |
| | | | | 705/7.27 |

(Continued)

FOREIGN PATENT DOCUMENTS

WO   WO-2014015385 A1 *   1/2014   ............. B63B 25/22

OTHER PUBLICATIONS

Junior, G. S., & Meira, S. R. (2009). Towards Effective Productivity Measurement in Software Projects. 2009 Fourth International Conference on Software Engineering Advances, doi: 10.1109/icsea.2009.44 (Year: 2009).*

*Primary Examiner* — Matthew S Gart
*Assistant Examiner* — Tiera J Fletcher
(74) *Attorney, Agent, or Firm* — Mannava & Kang, P.C.

(57) ABSTRACT

A productivity measuring, modeling and illustrating system receives input data pertaining to the productivity of an organization to generate various productivity views using a productivity maturity model. The productivity maturity model is based on suggested actions for increasing the productivity which are received in the input data. The productivity maturity model computes various productivity gains and provides productivity levels for the productivity levers associated with the organization. Various productivity views generated to display the productivity information include a summary view that displays the productivity gains and productivity levels using different filters.

20 Claims, 21 Drawing Sheets

(56) References Cited

U.S. PATENT DOCUMENTS

| | | | |
|---|---|---|---|
| 2011/0054968 A1* | 3/2011 | Galaviz | G06Q 10/06 705/7.28 |
| 2012/0159336 A1* | 6/2012 | Norwood | G06Q 10/00 715/733 |
| 2012/0331131 A1* | 12/2012 | Milden | G06Q 40/02 709/224 |
| 2013/0052105 A1* | 2/2013 | Butler | C02F 9/00 423/140 |
| 2015/0066555 A1* | 3/2015 | Vasudevan | G06Q 10/063114 705/7.15 |
| 2016/0080419 A1* | 3/2016 | Schiappa | H04L 63/1408 726/1 |
| 2016/0162128 A1* | 6/2016 | Hansen | G06F 8/38 715/747 |

\* cited by examiner

Lever wise Productivity (%) — 1602

| Productivity Levers | Basic | Leading | Advanced | Emerging |
|---|---|---|---|---|
| People Competencies | 0 | 0 | 0 | 0 |
| Industrialization | 0 | 5 | 10 | 10 |
| Intelligence and Automation | 3 | 5 | 7 | 7 |
| Industry Assets and Capabilities | 0 | 0 | 0 | 0 |
| Total Productivity | 3 | 10 | 17 | 18 |

1604

| Year | Productivity (%) | Onshore FTE (%) | Offshore FTE (%) | Onshore FTE Price ($/FTE) | Offshore FTE Price ($/FTE) | Effort Reduction (Hours) | Effort Reduction (FTE) |
|---|---|---|---|---|---|---|---|
| Year1 | 10 | 10 | 10 | 10 | 10 | 1000000 | 10000 |
| Year2 | 10 | 10 | 10 | 10 | 10 | 1000000 | 10000 |
| Year3 | 10 | 10 | 10 | 10 | 10 | 1000000 | 10000 |
| Year4 | 10 | 10 | 10 | 10 | 10 | 1000000 | 10000 |
| Year5 | 10 | 10 | 10 | 10 | 10 | 1000000 | 10000 |

Fig. 16

| Level | Team 1 Action | Team 2 Action | SubAction |
|---|---|---|---|
| Basic | Deploy people with right technical skills appropriate for the project. | | |

Fig. 17A 1702, 1710, 1704, 1706, 1708

| Level | Team 1 Action | Team 2 Action | SubAction |
|---|---|---|---|
| Basic | Implement Team 1 Delivery Methods | | Implement Team 1 Delivery Methods |
| Basic | Implement ADM based Project governance. | | Implement ADM based Project governance. |

Fig. 17B 1712, 1714, 1720

| Level | Team 1 Action | Client Action | SubAction |
|---|---|---|---|
| Basic | Conduct continuous evaluation of new tools for the "digital era" as appropriate for clients ecosystem | Embrace a tool-based project delivery mindset – make a plan for usage of Teams 1's intelligent tools | Identify the right set of tools and assets for the context of the engagement |
| Basic | Implement standard toolset | Approve implementation of standard toolset | Automated tool provisioning for the engagement |

Fig. 17C

| Level | Team 1 Action | Client Action | SubAction |
|---|---|---|---|
| Basic | Deploy relevant industry trained delivery resources | | |
| Leading | Comprehend clients business requirements and goals. | Facilitate the flow of business requirements and goals of IT project | |

Fig. 17D

PRODUCTIVITY MEASUREMENT, MODELING AND ILLUSTRATION SYSTEM

PRIORITY

This application claims priority to Indian Provisional Patent Application Serial No. 201641014389, filed on Apr. 25, 2016, and entitled "Productivity Measurement, Modeling and Illustration System", the entirety of which is incorporated herein by reference.

BACKGROUND

Productivity measures output and not outcomes. However, in many instances it is more difficult to measure output than outcomes. Also, the outcomes are commonly measured while measuring productivity may be more complicated. Myriad of tools are currently in use for measuring productivity of different departments in an organization. The productivity data from the different departments is stored in different formats in various data sources associated with the tools. Therefore, each department may have its own metrics and methodologies for measuring productivity which may be different from those of the other departments in the organization.

BRIEF DESCRIPTION OF DRAWINGS

Features of the present disclosure are illustrated by way of examples shown in the following figures. In the following figures, like numerals indicate like elements, in which:

FIG. 16 shows example data from the productivity file that enables generating the various productivity views.

FIG. 17A shows some examples of the suggested actions for increasing the productivity under the people competencies productivity lever.

FIG. 17B shows some example suggested actions for increasing the productivity under the industrialization productivity lever.

FIG. 17C illustrates some examples of the suggested actions that can contribute to an increase of productivity under the intelligence and automation productivity lever.

FIG. 17D shows some examples of the suggested actions that can contribute to the productivity gains under the industry assets and capabilities lever.

DETAILED DESCRIPTION

Figure 1:
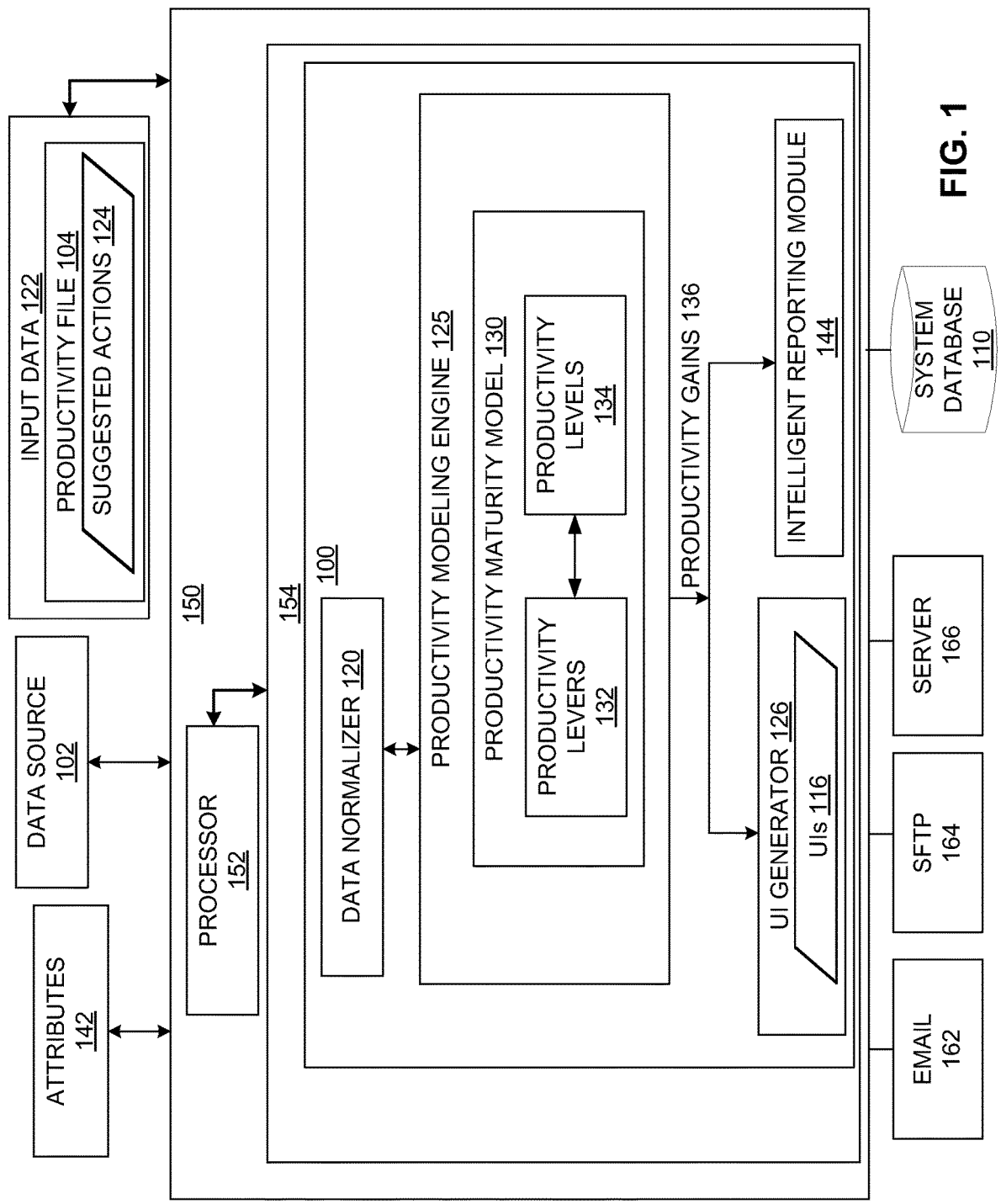
FIG. 1 shows a productivity measurement, modeling and illustration system, according to an example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a productivity measurement, modeling and illustration system is disclosed. The system generates and updates a productivity maturity model that measures productivity of an organization under different productivity categories or productivity levers. Productivity is a measure of efficiency to convert inputs into useful outputs by entities such as people, machinery, software applications and the like operating in the organization. Productivity may be measured by dividing an average amount of output generated over a time period by the total costs incurred or resources consumed such as capital, goods, energy, time and personnel that were used to generate the output over the same time period. Productivity is therefore an important measure of cost efficiency.

As productivity may measure the efficiency of different types of entities, measures of productivity changes were articulated based on various tools employed by such entities. Productivity measurements in such a diverse environment are largely dependent on the person measuring the productivity or the tools, metrics and methodologies used. Therefore, standardizing the measurement of productivity across the organization in an objective, quantifiable manner can be difficult in view of the myriad of tools, methodologies and metrics that currently exist for the productivity measurements. Moreover, a person who understands productivity measures across the various entities in the organization may have a much better grasp of how to increase the productivity as opposed to a person with a narrow understanding limited to certain entities or tools. For example, different productivity numbers can result from measuring productivity using different tools under the different productivity levers. Furthermore, the various tools may use different data formats to store productivity data associated with the different productivity levers. For example, while some tools may store the productivity data as percentages, other tools may store the productivity data as absolute numbers or as a certain measure such as time. Accordingly, no standard framework exists to obtain a comprehensive measure of productivity, assess productivity comparisons or aggregate productivity changes across the various productivity levers of the organization. Moreover, no tool exists that displays productivity pertaining to different categories during different time periods.

The system according to examples of the present disclosure generates a productivity maturity model that accesses certain suggested actions from a data source and estimates the productivity gains that can be realized upon implementing the suggested actions. Accordingly, the productivity maturity model provides a productivity maturity level that can be achieved for the organization under various categories or levers in which the productivity is measured based on the suggested actions to be implemented. The length of time an organization has been monitoring its productivity from different entities or in different categories and implementing actions to increase productivity may be obtained from the productivity maturity level. The productivity maturity of the organization can be classified as basic, leading, advanced, or emerging based on the duration of productivity monitoring. Productivity may be measured based on at least one of four categories associated with the organization or productivity levers which include, people, industrialization, intelligence and automation, and industry assets and capabilities. A productivity lever therefore pertains to a category, a department or an aspect of the organization under which the organization's productivity may be aggregated and measured.

The people lever can measure productivity changes associated with the employees of the organization. For example, actions may be suggested by the productivity maturity model that affect the employees and the productivity increases associated with such actions may be ascribed to the 'people' lever of the organization. The industrialization lever is associated with management practices such as establishing governance frameworks, 24/7 support structures, performing pyramid optimizations and the like. The intelligence and automation lever is associated with the various toolsets such as for automated generation of plans, automated test and defect management, and the like. The industry assets and capabilities lever pertains to applying leading industry frameworks, process models, thought leadership and the like.

The productivity maturity model measures and displays the productivity of an organization in each of the above mentioned productivity levers in addition to computing an aggregated productivity gain percentage from all the above-listed productivity levers. Also, the productivity modeling system is configured to generate views in a graphical user interface (GUI) to dynamically demonstrate the productivity gains that may be obtained upon implementing the suggested actions and provide other information. The GUI may provide views of productivity—year wise, lever wise, bundle wise which include simulation and fulfilment views. The system may simulate 'what-if' scenarios that show how productivity may vary based on different suggested actions selected for implementation. The success of the suggested actions in increasing the productivity to the projected levels can be measured and displayed via the fulfilment view or fulfilment monitor.

The examples disclosed herein provide a technical solution to the technical problem of displaying productivity information stored in different data formats. The system improves the functioning of a computer by not only simplifying the process of accessing productivity information pertaining to the plurality of productivity levers by the computer but also by configuring the computer to generate data structures such as the productivity data model that collate productivity information of different productivity levers which may be stored by different tools in various data formats. A simple configurable data interface such as a spreadsheet may be used to populate data pertaining to the plurality of productivity levers thereby mitigating the need for the system to connect to different data sources associated with the various tools in order to collate the productivity information. The productivity data model provides a standardized framework for comparing productivity information across the organization from the myriad of tools used for the different productivity levers to monitor productivity. The productivity data model enables producing various user interfaces that present productivity comparisons across the plurality of productivity levers that would otherwise be difficult to produce in view of the various data formats used for storing the productivity information. Multiple views for the productivity information are thus generated which include a productivity-lever view, a year-wise view, a bundle view, a technology view and the like.

FIG. 1 shows a computing apparatus 150 executing a productivity measurement, modeling and illustration system 100, referred to as the productivity modeling system 100, stored in a non-transitory data store 154 and executed by a processor 152. The computing apparatus 150 is connected to at least one data source 102. In one example, the productivity modeling system 100 can be modules of processor-executable instructions stored in the non-transitory processor-readable data store 154. The processor 152 executes the various instructions to carry out the tasks as outlined herein. The data source 102 may include but is not limited to flat files, comma separated values (CSV) files, spreadsheets, relational databases or combinations thereof. In an example, the data source 102 can be an external data source stored on one or more disparate computers which may be located proximate to or remotely from the computing apparatus executing the productivity modeling system 100. The productivity modeling system 100 may receive as input, data from the data source 102 or from system database 110. The system database 110 is used by the productivity modeling system 100 to store data fetched or otherwise received from the data source 102. The productivity modeling system 100 includes a data normalizer 120 whereby the data received as input is captured from the data source 102 and other sources, including user input. Scripts and queries may be executed to extract and load the data from flat file format, spreadsheet format or another format into the relevant tables with the system database 110.

The productivity modeling system 100 includes productivity modeling engine 125 which generates a productivity maturity model 130 for estimating productivity gains 136 associated with the various productivity levers 132. The productivity maturity model 130 may be generated from historic data and current data associated with the productivity levers 132, which may be received from the data source 102 and user input. The productivity maturity model 130 may determine productivity and classify productivity into four productivity levels 134 such as basic, leading, advanced, or emerging for at least one of the four productivity levers 132: people, industrialization, intelligence and automation, and industry assets and capabilities. The classification may be based on, for example, the productivity gains that are obtained from the suggested actions 124. In one example, a default productivity level of 'emerging' may be assigned to each of the productivity levers 132.

In one example, the input data 122 received by the productivity modeling system 100 may include suggested actions 124 associated with the different productivity levers 132 wherein the suggested actions 124 have productivity gain percentages associated therewith which may be obtained from the input data 122. The input data 122 may be gathered from a plurality of productivity tools (not shown) used within the organization to measure or monitor productivity of the various productivity levers 132. The plurality of productivity tools may store data regarding the plurality of productivity levers 132 in different data formats. The productivity gain percentage is indicative of the percentage increase expected in the productivity of one of the productivity levers if the suggested action were to be implemented. The productivity maturity model 130 may compute a respective total productivity gain percentage for each of the productivity levers 132 based on the productivity gain percentages of respective subsets of the suggested actions 124 associated with that productivity lever. For example the total productivity gain percentage of a productivity lever may be obtained as a sum of the productivity gain percentages of the respective subset of the suggested actions 124 that are associated with that productivity lever. It can be appreciated that other mathematical or statistical methodologies can be used to calculate the total productivity gain percentage of the productivity levers 132 in accordance with the examples discussed herein. Based on the range of the total productivity gain percentage of the productivity lever, the organization can be classified under one of the productivity levels 134 such as basic, leading advanced or emerging for that productivity lever 132. The organization can therefore be classified under different productivity levels 134 for different productivity levers 132. The productivity gains for the organization from the various productivity levers 132 associated therewith may be processed by the productivity maturity model 130 to obtain an aggregated productivity gain percentage. The aggregated productivity gain percentage may be obtained via one of the statistical operations, for example, mean, median, standard deviation and the like.

Various user interfaces (UIs) 116 may be generated by the productivity modeling system 100 to provide different views of the productivity gains. The UIs 116 may be generated in a GUI (Graphical User Interface). In one example, the UIs 116 may be used to receive user input, which may be used, along with information received from the data source 102, to generate the productivity maturity model 130. For example, an input UI screen may allow a user to enter the information regarding the organization, the attributes of a productivity study project for the organization such as the name of the project, the data source 102 to be used and the like. Also, the UIs 116 may output information via views for illustrating productivity improvement information using productivity levers 132, productivity levels 134, and the suggested actions 124. The productivity maturity model 130 processes the information from the data source 102 and generates the various productivity views such as but not limited to year wise, lever wise, bundle wise, simulation, fulfilment and the like.

In one example, users can specify various attributes 142 for controlling the views and generation of productivity reports, including but not limited to, the name of the report, the periodicity for running the report, the delivery modes of the report, the recipients that should receive the report and the data sources to be used in the report via a configuration UI. The attributes 142 supplied by the user may be stored in the system database 110 and later retrieved at the time of report generation or UI generation. A UI generator 126 may generate the UIs 116 that display the various views of productivity numbers generated by the productivity maturity model 130. The productivity maturity model 130 may be configured for execution within the cloud, for example, as a portal which may be accessed via the Internet and viewed in a browser. Accordingly, the UIs 116 may be generated in different formats that may be accessible via a wide variety of remote client devices which may include without limitation, desktops, laptops, tablet devices, smartphones, wearables and the like.

Intelligent reporting module 144 may generate reports of productivity, including output from the productivity maturity model 130. The reports may be customized by a user via one or more of the UIs 116 and may be output through one or more of the UIs 116. Also, the reports may be delivered to the recipients via the delivery modes specified by the user in the attributes 142. The reports can be delivered as attachments via email 162, or the reports may be uploaded to secure locations such as an SFTP (Secure File Transfer Protocol) 164 or to a server 166. When the reports are uploaded to the SFTP or SharePoint server, an email including a link to the storage location of the report may be sent to the recipients. In an example, different recipients can receive the reports via different delivery modes.

The productivity modeling system 100 is operable to provide a standardized way for illustrating productivity improvement using standardized productivity levers 132, productivity levels 134, various productivity views and suggested actions 124 needed to achieve productivity improvement. The productivity modeling system 100 helps to facilitate sales and delivery teams for effective discussions with clients through various views of productivity and provide illustration of how productivity will vary based on actions. The productivity maturity model 130 is dynamically able to update the productivity gains based on edits to the suggested actions 124 so that the UIs 116 are also dynamically updated as the users select/deselect particular actions or sub-actions from the suggested actions 124. Also, the productivity modeling system 100 provides interfaces to allow configurable spreadsheet templates, such as the productivity file 104 from the data source 102 to facilitate usage of data from solution plans and solution architecting guidelines that can be easily populated in the spreadsheet templates. Consequently, the functioning of a computing device is improved in that the productivity modeling system 100 generates data structures such as the productivity maturity model 130 and the various UIs 116 that allow data pertaining to the various productivity levers 132 to be aggregated and viewed in different ways.

Figure 2:
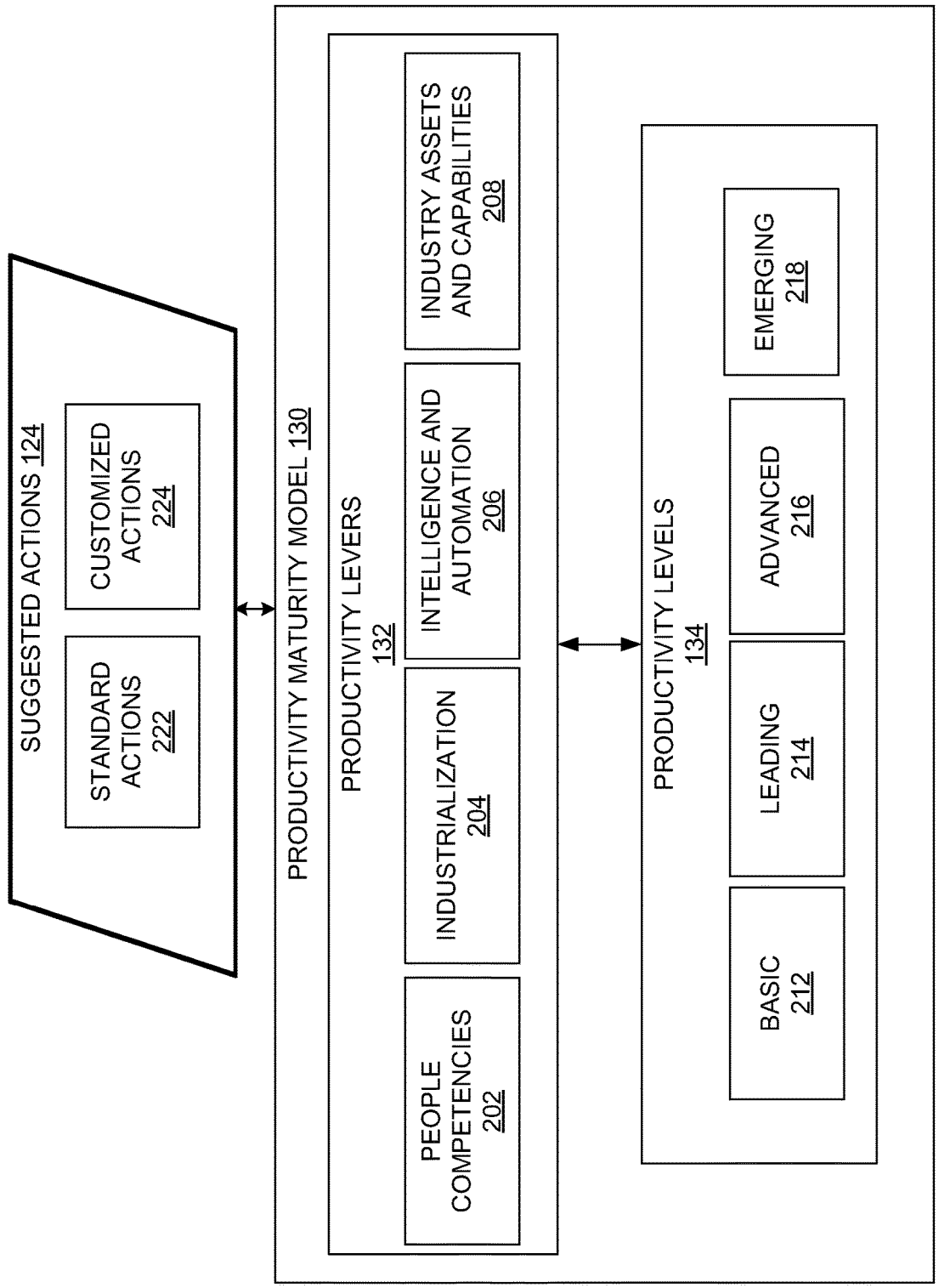
FIG. 2 shows a block diagram that illustrates details of the productivity maturity model, according to an example.

FIG. 2 is a block diagram that illustrates one example of the productivity maturity model 130. The input data 122 which includes the productivity file 104 with the suggested actions 124 is received by the productivity modeling system 100 from the data source 102. The productivity file 104 may be used to build the productivity maturity model 130. The input data 122 or the productivity file 104 may also include information regarding the various productivity levers 132 for which the suggested actions 124 may improve productivity. The suggested actions 124 may include certain standard actions 222 which are included in a default template used to generate the productivity file 104. In an example, the standard actions 222 may only be viewed via the UIs 116 and may not be edited by users. In another example, the standard actions 222 may be edited via directly editing the productivity file 104.

The productivity file 104 is also configured to enable a user to input certain customized actions 224 which may be unique to a particular project. Each one of the suggested actions 124 is associated with a corresponding one of the productivity levers 132 so that when the suggested action is executed on an entity associated with the respective lever, the productivity associated with the lever is estimated to improve by a respective predetermined value which may be expressed as a percentage or by a predetermined productivity gain percentage. In an example, the predetermined productivity gain percentage may be included for each of the suggested actions in the input data 122 received by the productivity modeling system 100. The suggested actions 124 that are included by default into the productivity file 104 may be edited to define and add new customized actions 224 or to delete certain standard actions 222 or prior customized actions 224 used in the productivity maturity model 130. When a new customized action is added to the productivity maturity model 130 by a user, its associated attribute values such as the corresponding productivity lever, a numerical value indicative of the predetermine productivity gain percentage that the new customized action contributes to the corresponding productivity lever, one or more sub-actions, a value indicative of whether the action is to be executed by one or more of the organization or a vendor of the organization and the like may also be entered. If, during the course of usage, a customized action is deemed important, for example via repeated usage, it may be included into the standard actions 222 provided by default with the productivity file 104.

The productivity levers 132 are broadly classified as people competencies 202, industrialization 204, intelligence and automation 206 and industry assets and capabilities 208. As discussed herein, for each of the suggested actions 124 a corresponding productivity lever is also included so that the suggested action may be executed on an entity of the productivity lever thereby enhancing the productivity of that productivity lever. Based on the magnitude of the productivity gains contributed to by a subset of the suggested actions 124 for a given one of the productivity levers 132, the productivity gain associated with the productivity lever can be classified under one of the productivity levels 134 which include basic 212, leading 214, advanced 216 and emerging 218.

Each of the productivity levels 134 is associated with a range of productivity gains within the productivity maturity model 130. By the way of a non-limiting example, a first productivity lever whose total productivity gain from a first subset of suggested actions 124 included in the productivity file 104 lies within the lowest range of productivity gains such as, for example, 1%-3% may be classified under the basic level 212. Similarly, a second productivity lever whose total productivity gain from a second subset of suggested actions 124 included in the productivity file 104 lies between 4%-8% may be classified as leading 214. A third productivity lever whose total productivity gain from a third subset of the suggested actions 124 included in the productivity file 104 ranges from 9%-12% may be classified as advanced 216. And a fourth productivity lever whose total productivity gain from a fourth subset of the suggested actions 124 included in the productivity file 104 ranges from 13%-15% may be classified as emerging 218. In this example, the maximum productivity gain projected using all the levers may be approximately 40%. The subsets of the suggested actions 124 described above are exclusive in that a suggested action may only be classified under a single productivity lever. It may be appreciated that the numerical values for the productivity gain percentages are specified herein only by the way of illustration and that the numerical values for classifying the productivity levers 132 under different productivity levels 134 may vary within an organization and/or a project.

As the suggested actions 124 can be dynamically included or excluded from the productivity file 104, the productivity level associated with the corresponding productivity lever may also vary dynamically. If new suggested actions corresponding to the productivity lever are added to the productivity file 104, so that the productivity gain associated with the productive lever increases beyond the range of its current productivity level, a succeeding productivity level with a higher range may be automatically selected for associating with the productivity lever. Conversely, if existing suggested actions associated with a productive lever are deleted from the productivity file 104 so that the productivity gain associated with the productive lever falls below the range of its current productivity level, a preceding productivity level with a lower productivity gain may be automatically selected for association with the productivity lever. In an example, the standard actions 222 and the customized actions 224 may include further sub-actions as will be detailed further herein.

The productivity lever 'people competencies' 202 enables the productivity maturity model 130 to process productivity numbers associated with the personnel or employees of the organization, and suggested actions to be implemented to improve the productivity of the personnel and monitor the productivity gains obtained via the implementation of the suggested actions. Similarly, the productivity lever 'industrialization' 204 can be used to estimate how well the organization implements the various management processes. For example, establishing support structures or implementing improvement programs such as Lean Six Sigma may be the suggested actions improve productivity under the industrialization lever 204. Implementation of various tools sets such as cognitive tools, tools for web analytics and implementation of other procedures that better enables the organization to function in the digital era are some of the examples of the suggested actions that lead to productivity gains under the 'intelligence and automation' lever 206. Organizational assets and their management can be classified under the 'industry assets' lever 208.

Figure 3:
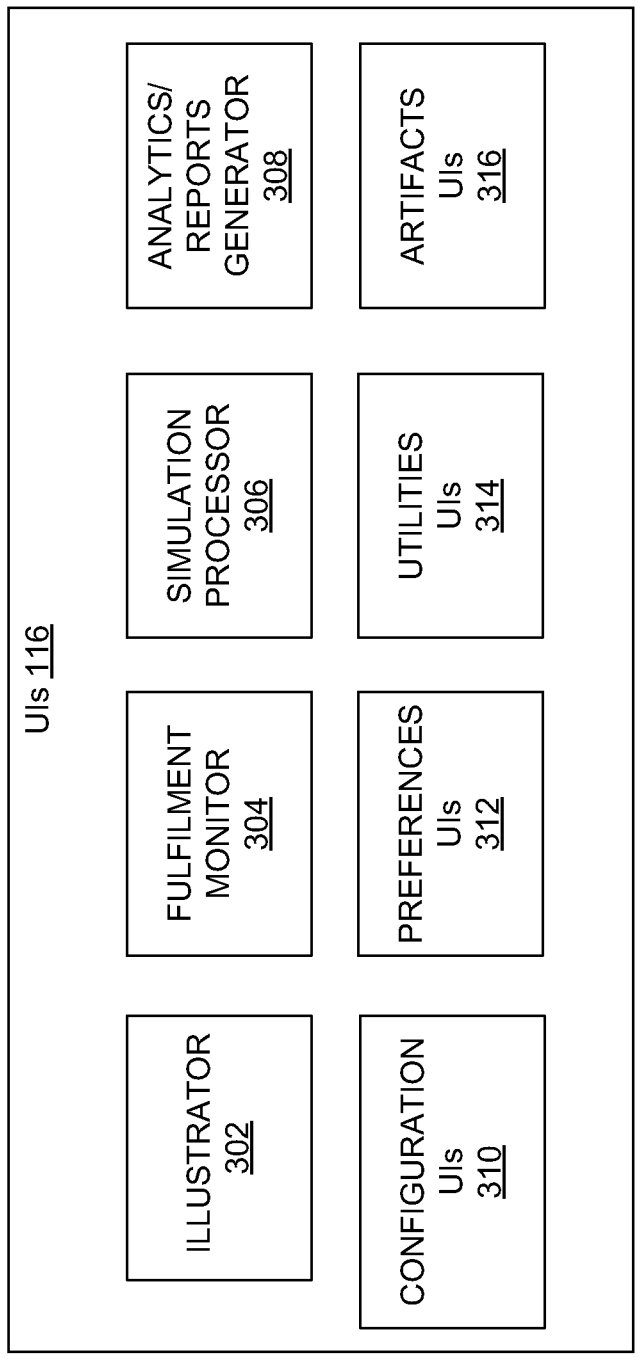
FIG. 3 details some of the user interfaces that are generated in accordance with some examples.

The productivity modeling system 100 thus provides a standardized, central platform to examine, analyze and improve the overall productivity of the organization via improving the productivity in its various aspects. FIG. 3 details some of the user interfaces 116 that are generated in accordance with some examples. The illustrator 302 generates various views to show productivity changes in the organization. For example, productivity levers view, year-wise view and the like can be generated by the illustrator 302.

The fulfilment monitor 304 enables tracking productivity gains over the years that were realized from implementing the suggested actions 124. Rather than prospective productivity gains as displayed in views generated by the illustrator 302, the fulfilment monitor 304 provides historical or archived information regarding the productivity gains that were actually realized over time for one or more filters such as, productivity levers, year-wise, level-wise or combinations thereof when the suggested actions were implemented.

For example, UIs generated by the fulfilment monitor 304 may include views that map the productivity gains achieved with the target productivity.

The simulation processor 306 enables simulating productivity changes under various dynamically changeable 'what-if' scenarios. For example, if the organization is unwilling to implement all the suggested actions 124 from the productivity file 104, a 'what-if' scenario can be examined via removing certain suggested actions. Similarly, a 'what-if' scenario for the productivity gains can be examined when new suggested actions are added to the productivity file 104. The decrease or increase in the productivity gains of the associated productivity lever(s) for the deleted actions or the newly added suggested actions and the aggregated productivity gain percentage for the project as a whole may be examined. In an example, the productivity gain percentage may change due to changes to the suggested actions so that the productivity level of the corresponding productivity levers is altered.

The analytics/reports generator 308 generates productivity reports relevant to target productivity based for example, on various analytics which are examined. The configuration UIs 310 enable a user such as, a solution architect, to configure new opportunities or update existing ones by uploading the project details using predefined templates. The preferences UIs 312 enable users to provide their preferences for the customization of home page files with respect to their visibility, accessibility or order. The utilities UI 314 enable authorized personnel to monitor and administer the productivity modeling system 100. The artifacts UIs 316 enables access, for example, by providing links to supporting documents that facilitate productivity discussions.

Figure 4:
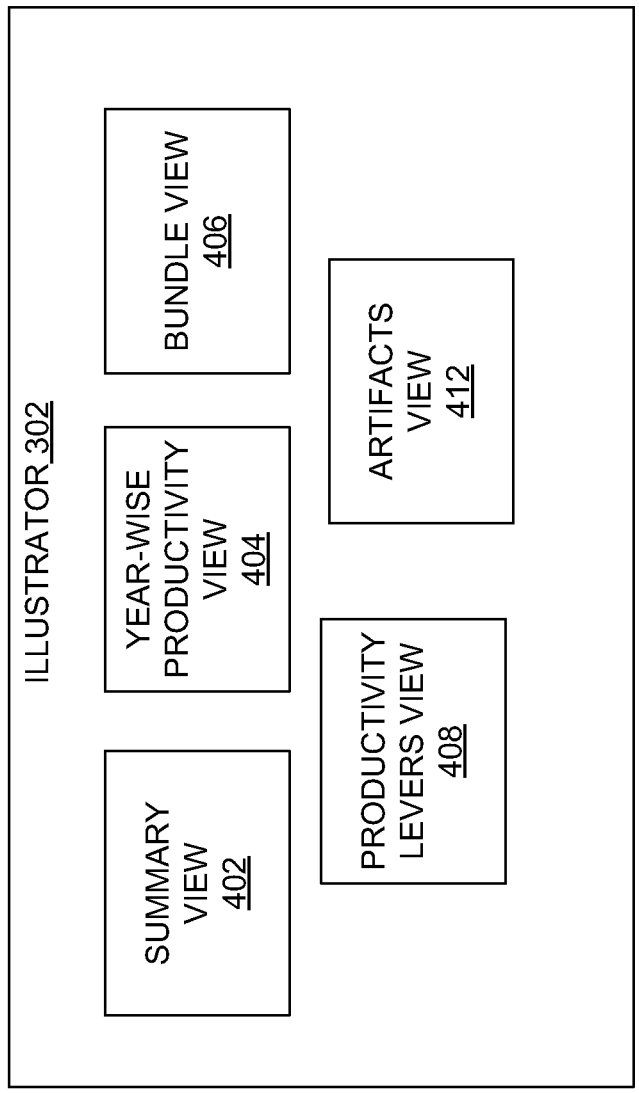
FIG. 4 depicts an illustrator which is one of the user interfaces generated by the productivity modeling system.

FIG. 4 depicts an illustrator 302 which is one of the user interfaces 116 generated by the productivity modeling system 100. The illustrator 302 provides a portal from which various views may be accessed. The illustrator 302 is configured for access from various client devices such as desktops, laptops, smartphones, wearable devices and the like. A summary view 402 illustrates lever-wise productivity contributions and the total productivity over all the productivity levers 132. The year-wise productivity view 404 illustrates annual productivity gains including the productivity gains obtained over the previous year, various filters to the annual productivity views such as year-wise productivity for a given productivity lever or year-wise productivity for a given productivity level and the like. The bundle view 406 provides productivity numbers from the various functional and technological segments of the organization. As the organization can be using more than one technology and may implement a plurality of applications within different departments, the bundle view 406 illustrates improvements in productivity that can be achieved in a given technology or for a given application via implementing a subset of the suggested actions 124 corresponding to the application or technology.

The productivity lever view 408 provides productivity data for the various productivity levers 132. For example, if the industrialization lever 204 has a productivity gain of 13% in the productivity view 408, then selecting the industrialization lever 204 from the productivity lever view 408 enables a user to drill down further in a list of tools and the productivity number that is gained for each tool. Hence, the user is informed on how the 13% gain in productivity is achieved under the industrialization lever 204. The artifacts view 412 provides access to the various artifacts such as but not limited to, documents, presentations, infographics and the like that pertain to the productivity discussions. In an example, the related artifacts may be saved to a system database 110 and links to the artifacts may be provided on the artifacts view 412 that enable the user to quickly access the relevant artifacts during productivity discussions.

Figure 5:
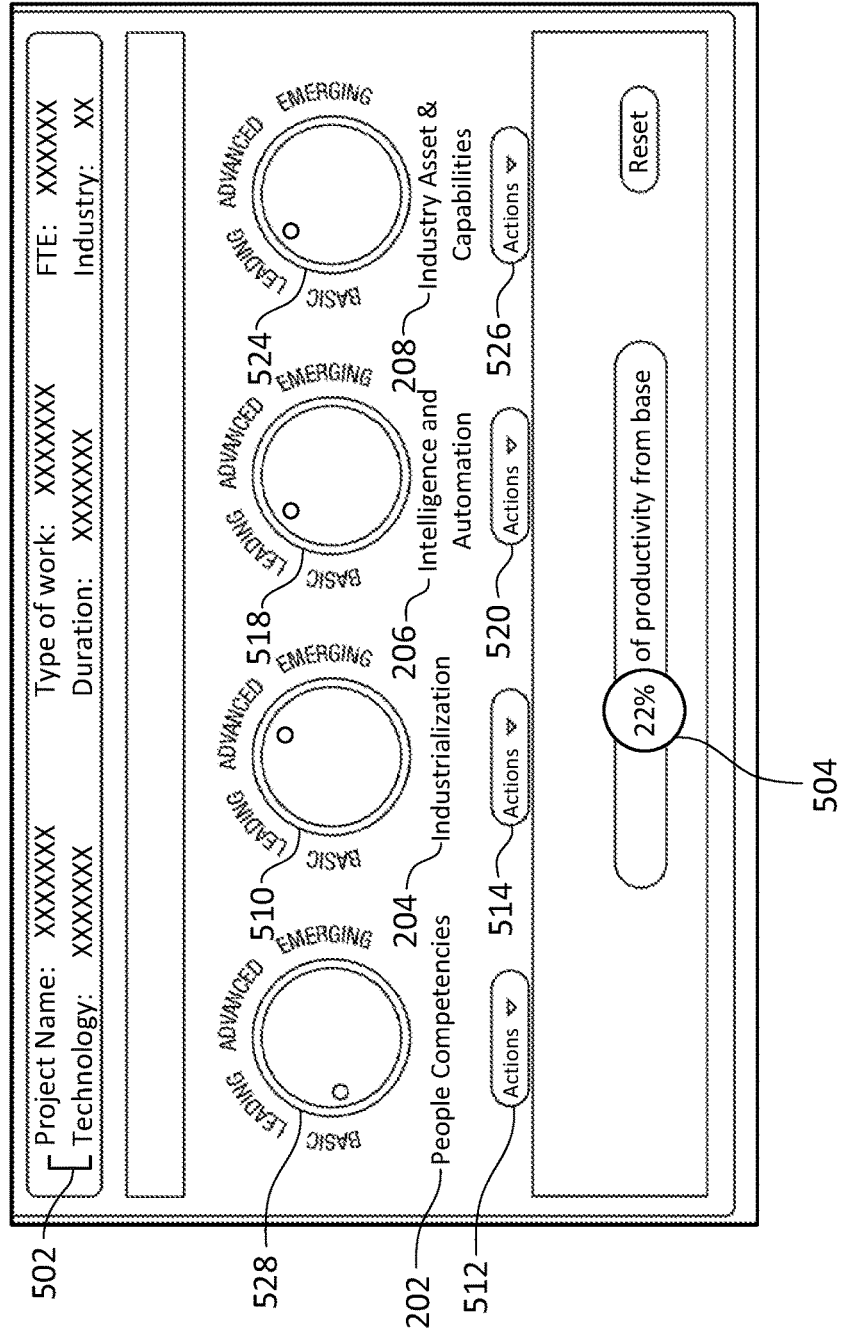
FIG. 5 shows an illustration of the summary view as generated by the illustrator.

FIG. 5 shows an illustration of the summary view 402 as generated by the illustrator 302 in accordance with one example. The summary view 402 illustrates attributes 502 of the project such as the project name, the type of work, the FTE, the technology used in the project, the duration of the project and the like. In addition, the summary view shows an aggregated productivity gain percentage 504 that can be obtained from the productivity levers 132 for the given project. The summary view 402 also includes for each productivity lever, an 'action' button which when clicked displays a respective subset of the suggested actions 124 associated with the productivity lever.

The productivity gain from the people competencies lever 202 is 0% as indicated by the UI element 528. Hence, the productivity gain for the people competencies lever is classified under the 'basic' productivity level 212 and when the 'actions' button 512 of the people competencies lever is clicked, it may not produce any suggested actions since no productivity gain is displayed. In an example, the user may add new suggested actions to the suggested actions 124 included in the productivity file 104 in which case a finite productivity gain may be displayed for the people competencies lever 202. The productivity gain from the industrialization lever 204 is indicated as 12 percent and is classified under the 'advanced' level as shown by the UI element 510. Moreover, when the 'actions' button 514 is clicked, the list of suggested actions that contribute to the productivity gain of 12 percent under the industrialization lever 204 are displayed. The productivity gain from the 'intelligence and automation' lever 206 as indicated by the UI element 518 is 6 percent which is classified as a 'leading' productivity level and when the 'actions' button 520 is clicked, the actions that contribute to the 6 percent productivity gain are displayed. Similarly, the productivity gain from the 'industry asset and capabilities' lever 208 as indicated by the UI element 524 is 4 percent which is also classified as a 'leading' productivity level and when the 'actions' button 526 is clicked, the actions that contribute to the 4 percent productivity gain are displayed. The aggregated productivity gain percentage 504 from the four productivity levers is 22 percent from the base productivity.

Figure 6:
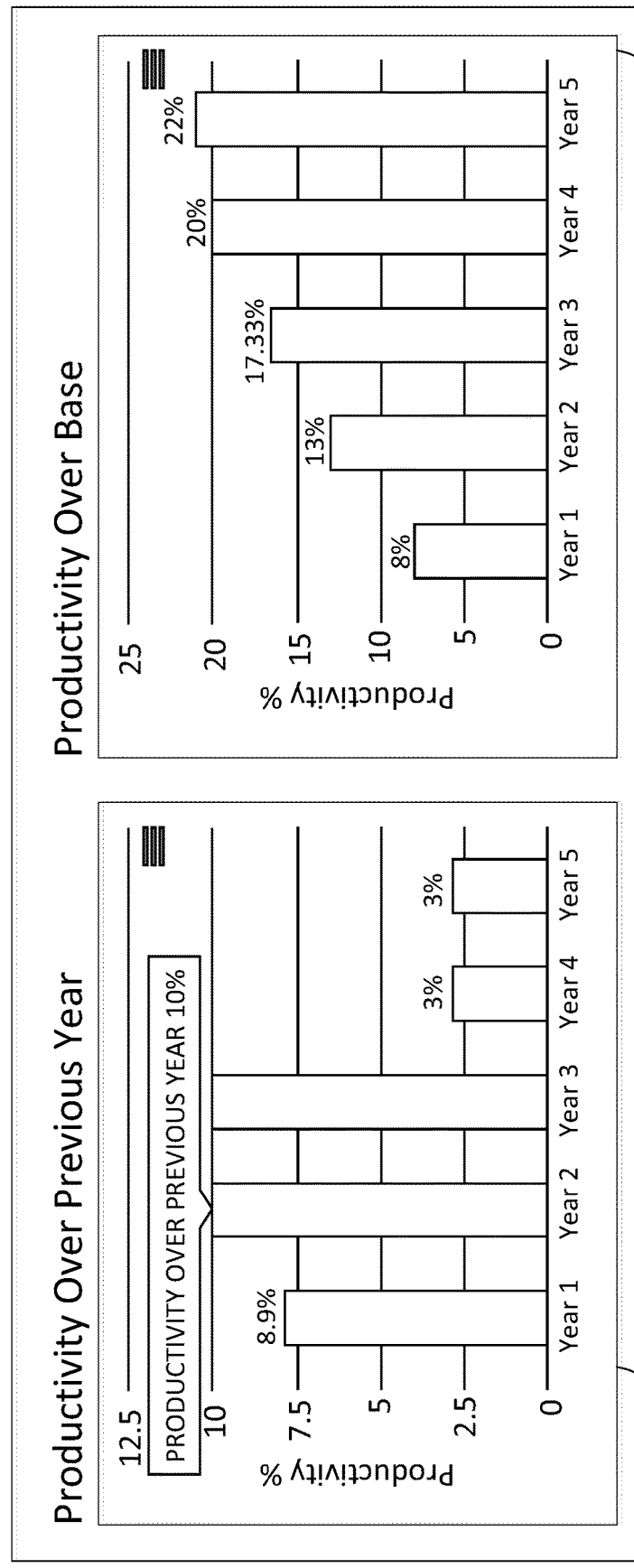
FIG. 6 shows a year-wise productivity view that displays year-wise aggregated productivity gain percentage.

FIG. 6 shows an example year-wise productivity view 404 that displays year-wise aggregated productivity gain percentage with various filters. At 602, the productivity is mapped against the prior years so that the productivity gains over the years may be examined. The productivity gains over a base are computed and displayed at 604.

Figure 7:
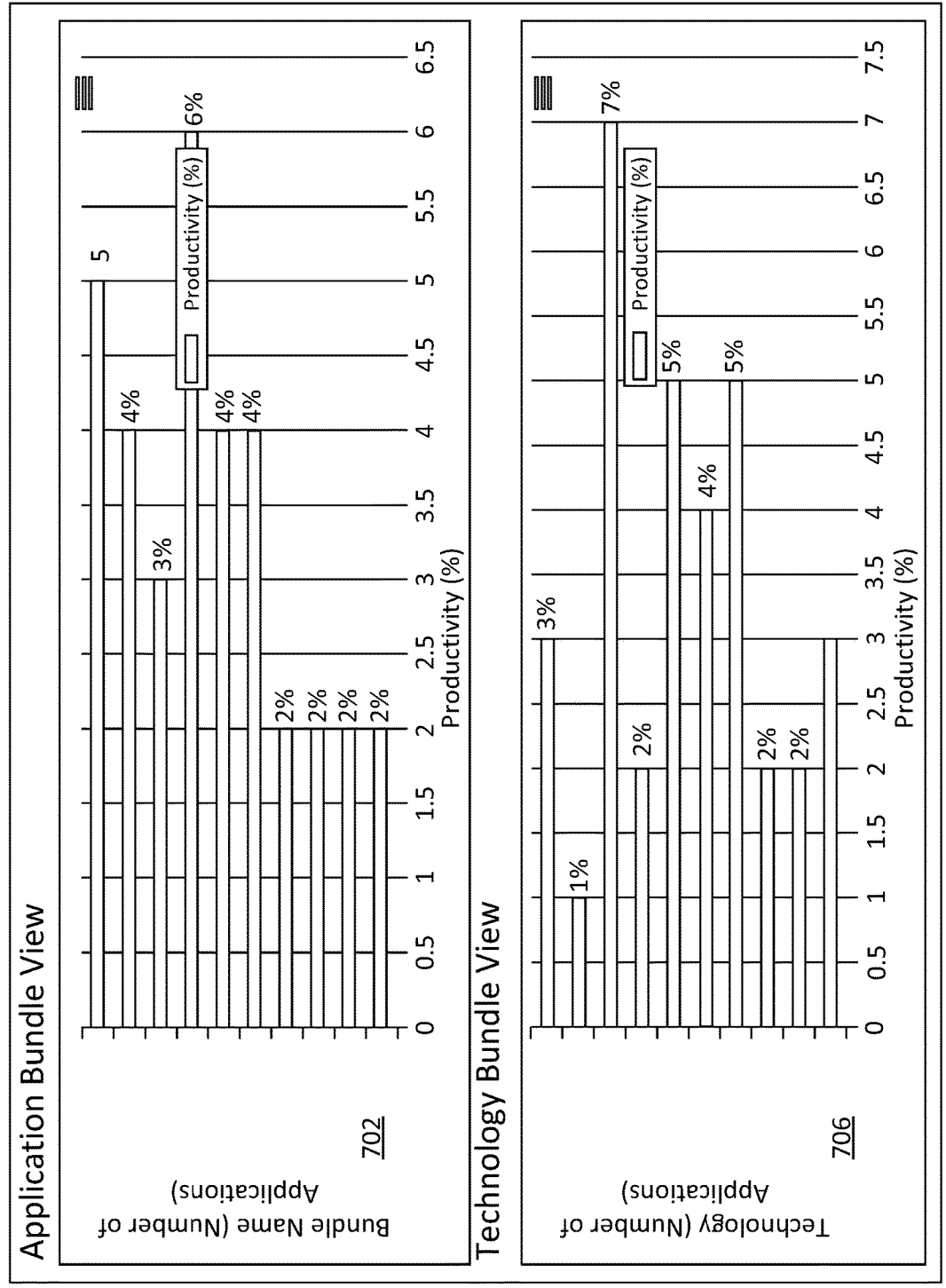
FIG. 7 is an illustration that shows an example bundle view generated by the illustrator.

FIG. 7 is an illustration that shows an example bundle view 406 generated by the illustrator 302. The bundle view 406 shows an application bundle view 702 and a technology bundle view 704. The application bundle view 702 shows a mapping between the number of applications associated with each department or division and the productivity gains in terms of percentages that were achieved within the division. The technology bundle view 704 shows the various technologies associated with the applications used in the different departments illustrated in the application bundle view 702. The technology bundle view 704 maps the technologies to the percentage of productivity associated with each technology.

Figure 8:
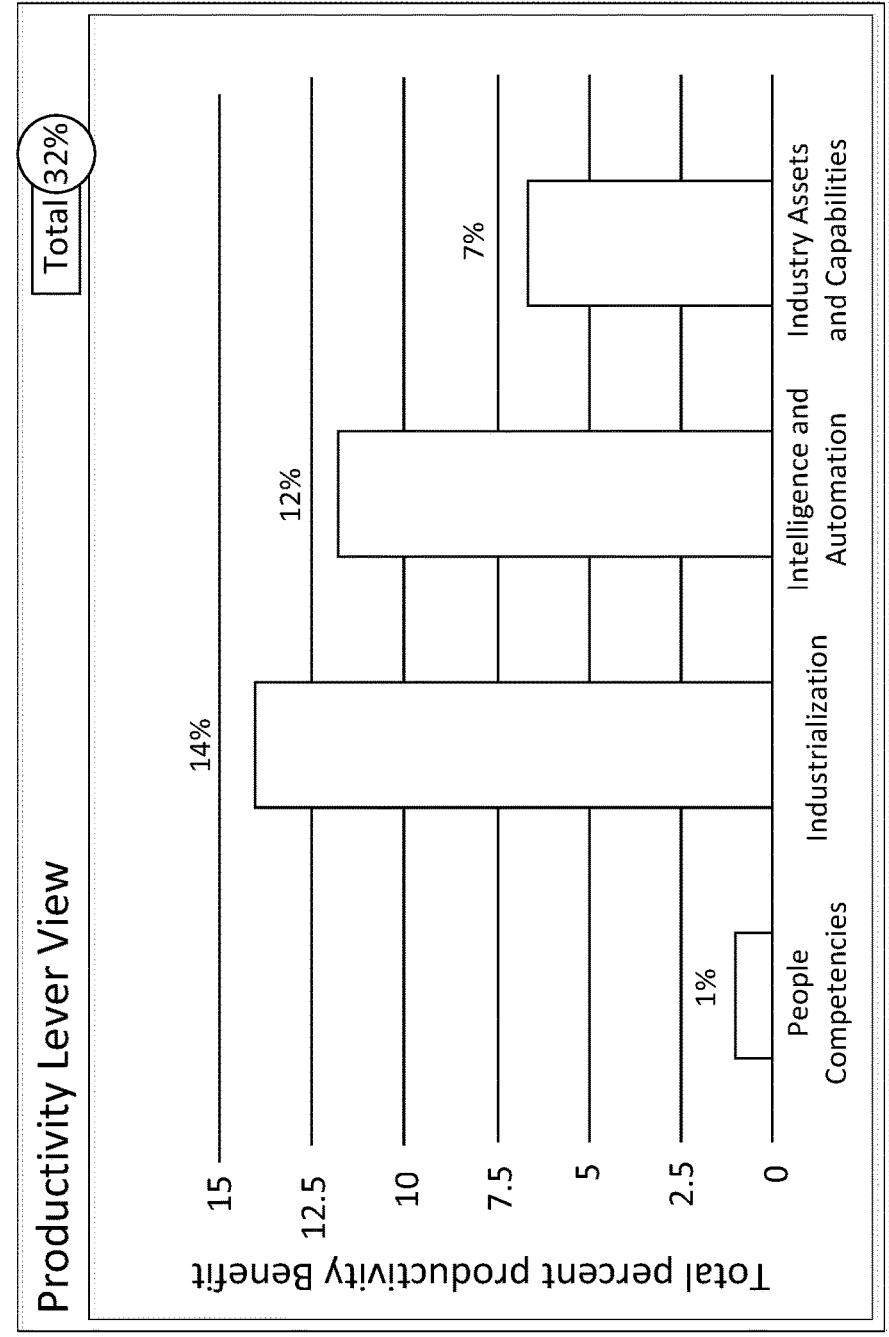
FIG. 8 shows an example of the productivity levers view generated by the illustrator.

FIG. 8 shows an example of the productivity levers view 408 generated by the illustrator 302. The productivity gains under each of the productivity levers 132 is shown in as a bar graph. A total productivity gain of 32 percent is obtained as a sum of the productivity gains including 1 percent from people competencies 202, 14 percent from industrialization 204, 12 percent from intelligence and automation 206 and 7 percent from industry assets and capabilities 208. The various productivity gain percentages displayed in this view may be retrieved from the productivity file 104. The percentages shown in FIG. 6, FIG. 7 and FIG. 8 may not represent actual measured percentages and are provided for illustration purposes only.

Figure 9:
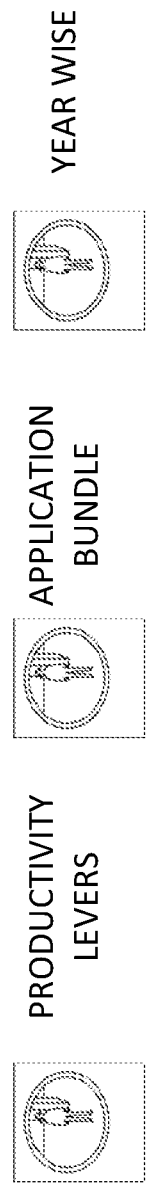
FIG. 9 illustrates an example of artifacts view that provides access to the various artifacts that may be used for discussions.

FIG. 9 illustrates an artifacts view 412 generated by the illustrator 302 for accessing the various artifacts that may be used for project discussions in accordance with one example. In many instances, software documentation including code modules are referred to as artifacts. The artifacts view 412 therefore provides access, for example, via links to the relevant documents, code modules, presentations, data files and the like that may be used for retrieving or updating information related to the productivity of the organization. Therefore, the artifacts may include files of various formats such as but not limited to documents detailing best practices, links to industry assets and the like. In one example, a user may be allowed to configure the list of documents which can be accessed from the artifacts view 412.

Figure 10:
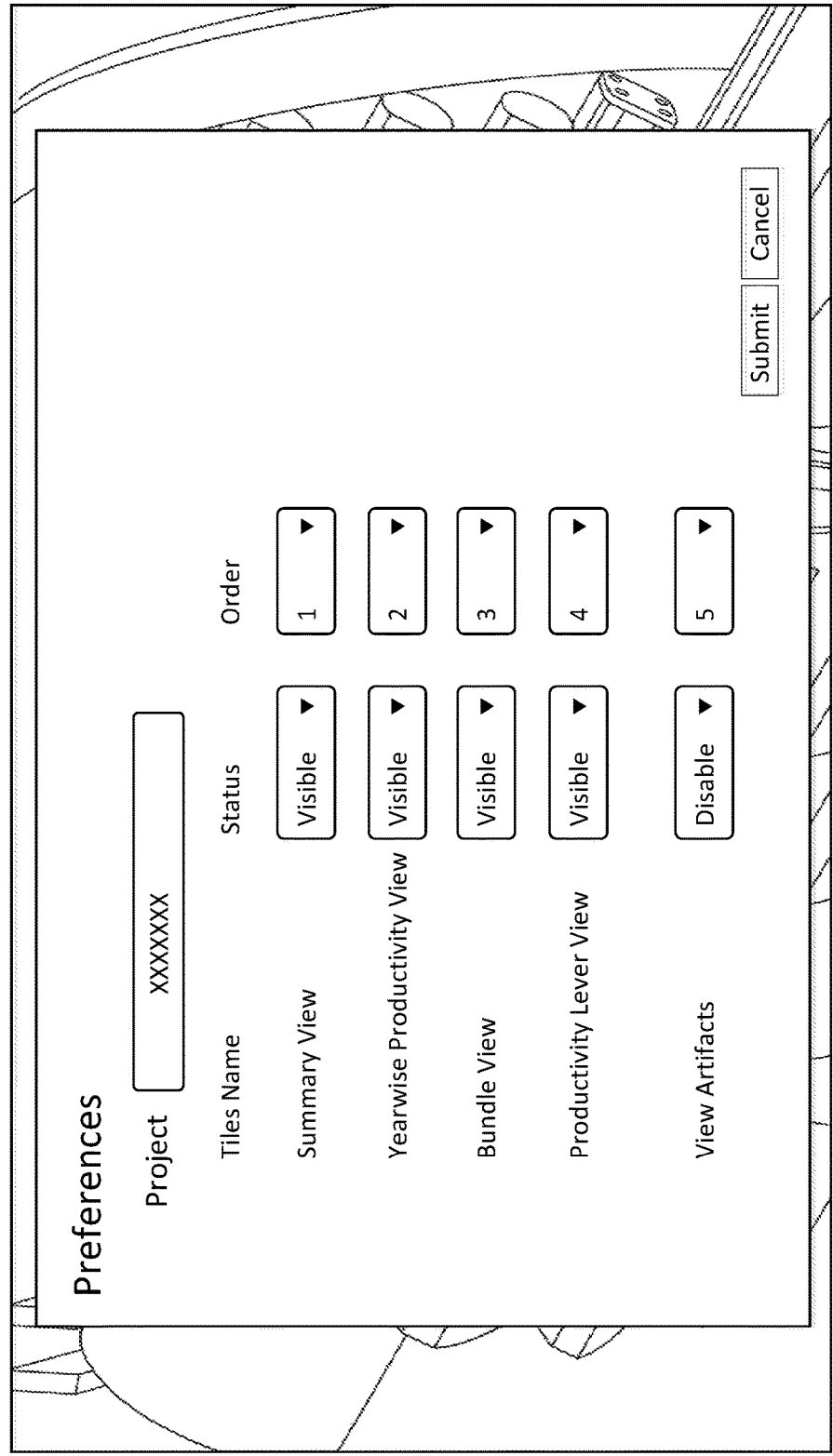
FIG. 10 illustrates an example of a preferences UI (User Interface) of the productivity modeling system.

FIG. 10 illustrates preferences UI 312 of the productivity modeling system 100 in accordance with one example. The preferences UI 312 illustrates a page which enables a user to set various attributes for generating the views. The example UI 312 enables the user to set the status and the order of appearance for the various productivity views. For example, the status of the various views except the artifacts view is set to 'Visible' while a numerical value is used to indicate the order to appearance during a presentation.

Figure 11:
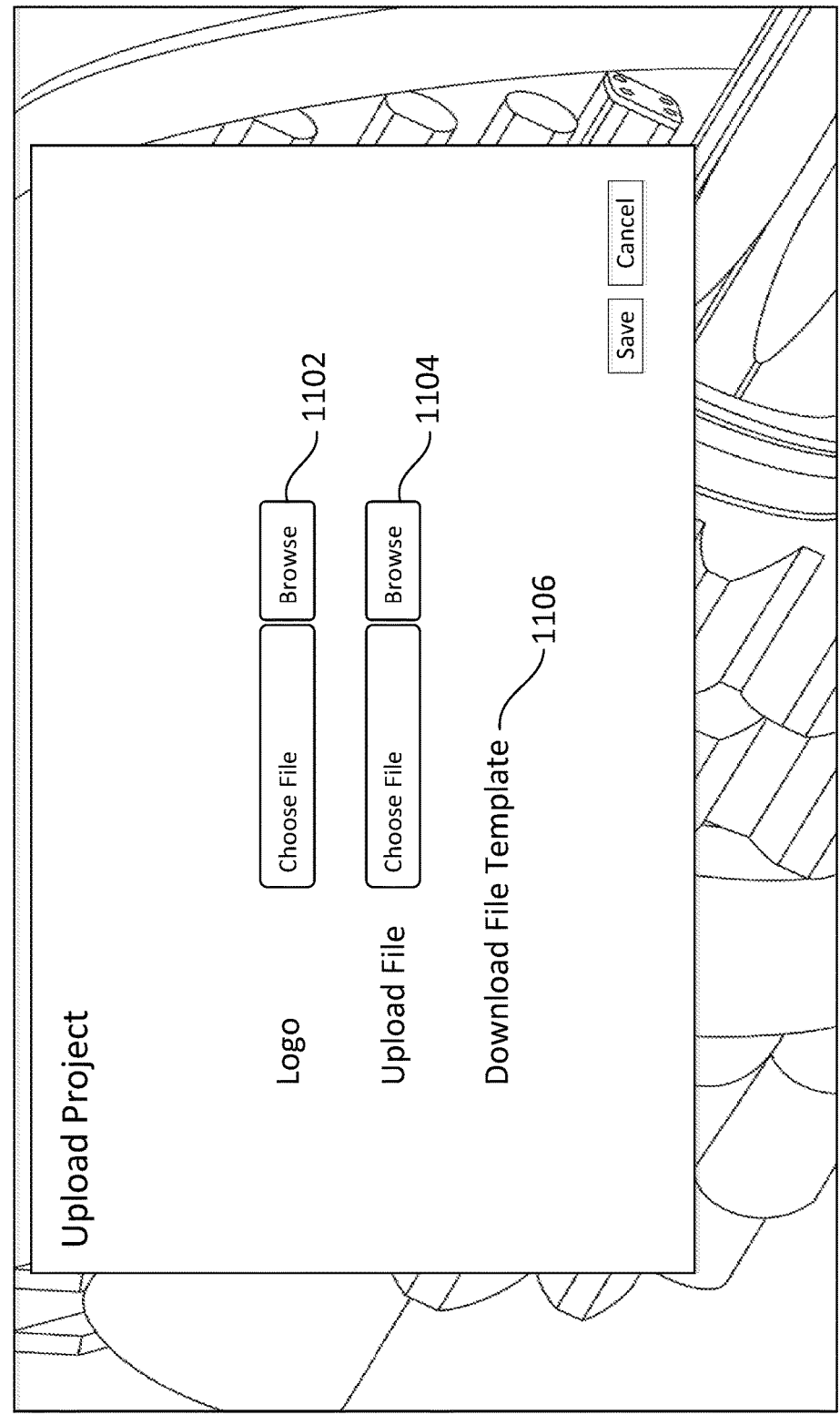
FIG. 11 shows an example of one of the configuration UIs such as an 'upload project' screen that enables a user to start a new project to study productivity.

FIG. 11 shows an example of one of the configuration UIs 310 such as an 'upload project' screen 1100 that enables a user to start a new project or opportunity to study productivity. A logo may be selected via a logo button 1102 for use with the project in addition to a link 1106 for downloading a file template is also included in the upload project screen 1100. In an example, the downloaded file template may include standard actions 222 for each of the productivity levers 132. The downloaded file template may be populated with information pertaining to the project to generate the productivity file 104. The productivity file 104 thus generated from the downloaded template by populating information pertaining to the project may be uploaded via a file upload button 1104. The uploaded file is used for generating the productivity maturity model 130.

Figure 12:
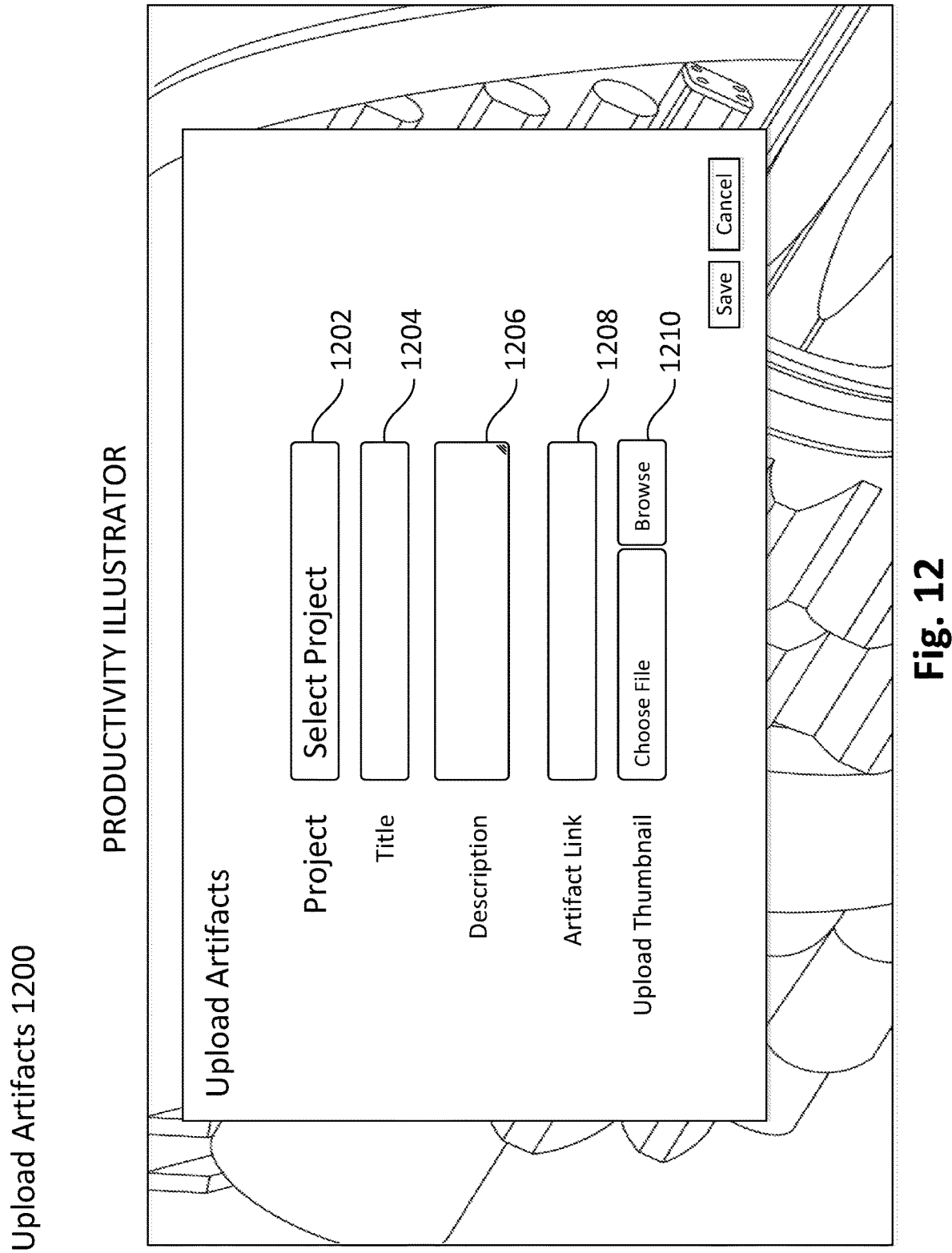
FIG. 12 shows an example of an upload artifacts UI that enables uploading artifacts to be used in the project.

FIG. 12 shows an example of an upload artifacts UI 1200 that enables uploading artifacts to be used in the project while supplying attributes of the artifacts. The attributes for the artifacts may include but are not limited to, specifying a project 1202 for which the uploaded artifacts are to be used, the title 1204 and description 1206, link 1208 and a thumbnail 1210 for each artifact. The artifacts thus uploaded may be stored to the system database 110 and accessed via the artifacts view 412.

Figure 13:
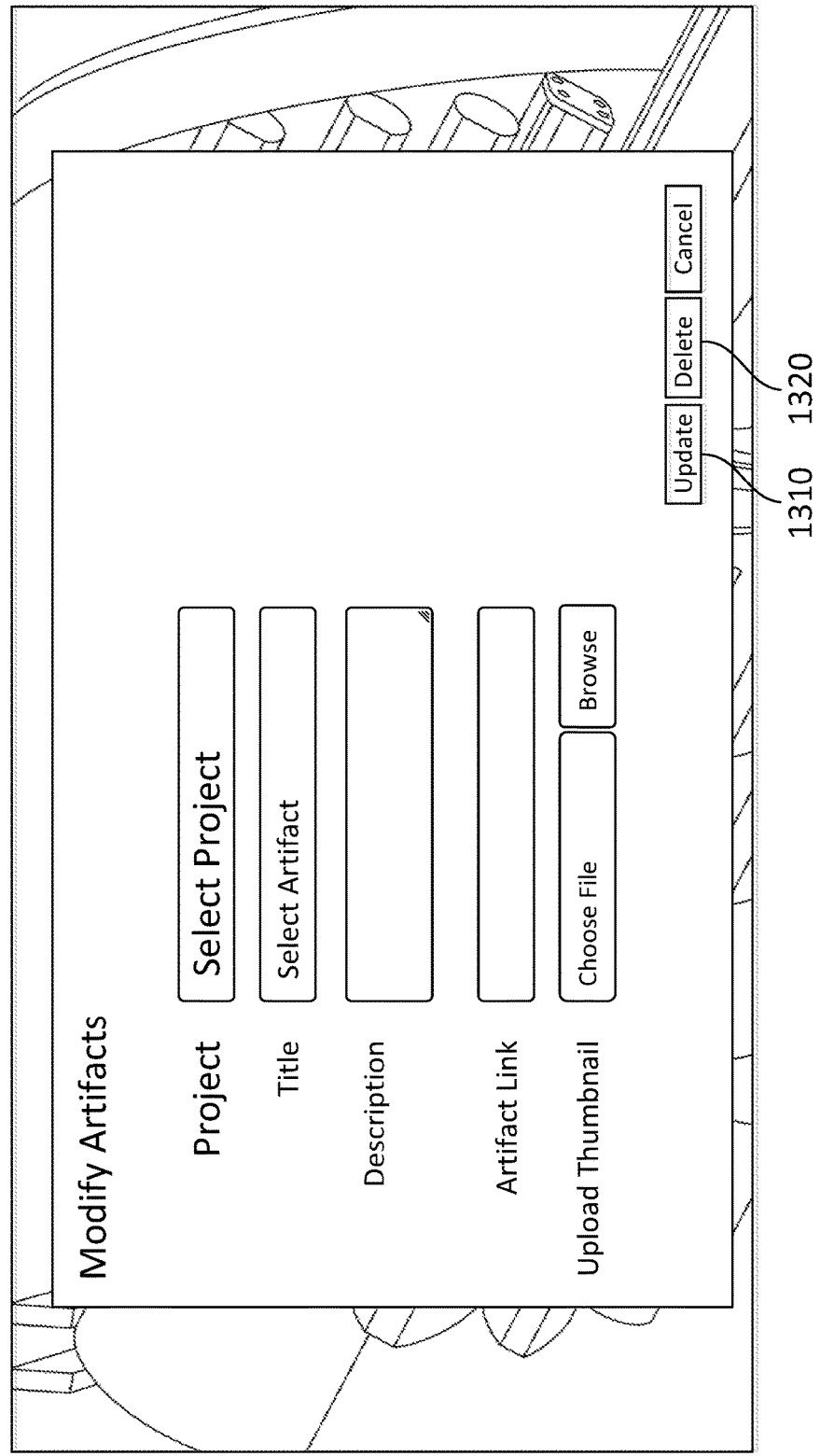
FIG. 13 shows an example of a UI for modifying artifacts.

FIG. 13 shows an example of a UI 1300 for modifying artifacts that enables a user to modify uploaded artifacts. The UI elements provided for modifying the artifacts are similar to those used for uploading the artifacts so that the attributes provided when uploading the artifacts may be later modified via the modification screen 1300. However, an update 1310 and a delete button 1320 are provided for updating modified artifacts or deleting certain selected artifacts.

Figure 14:
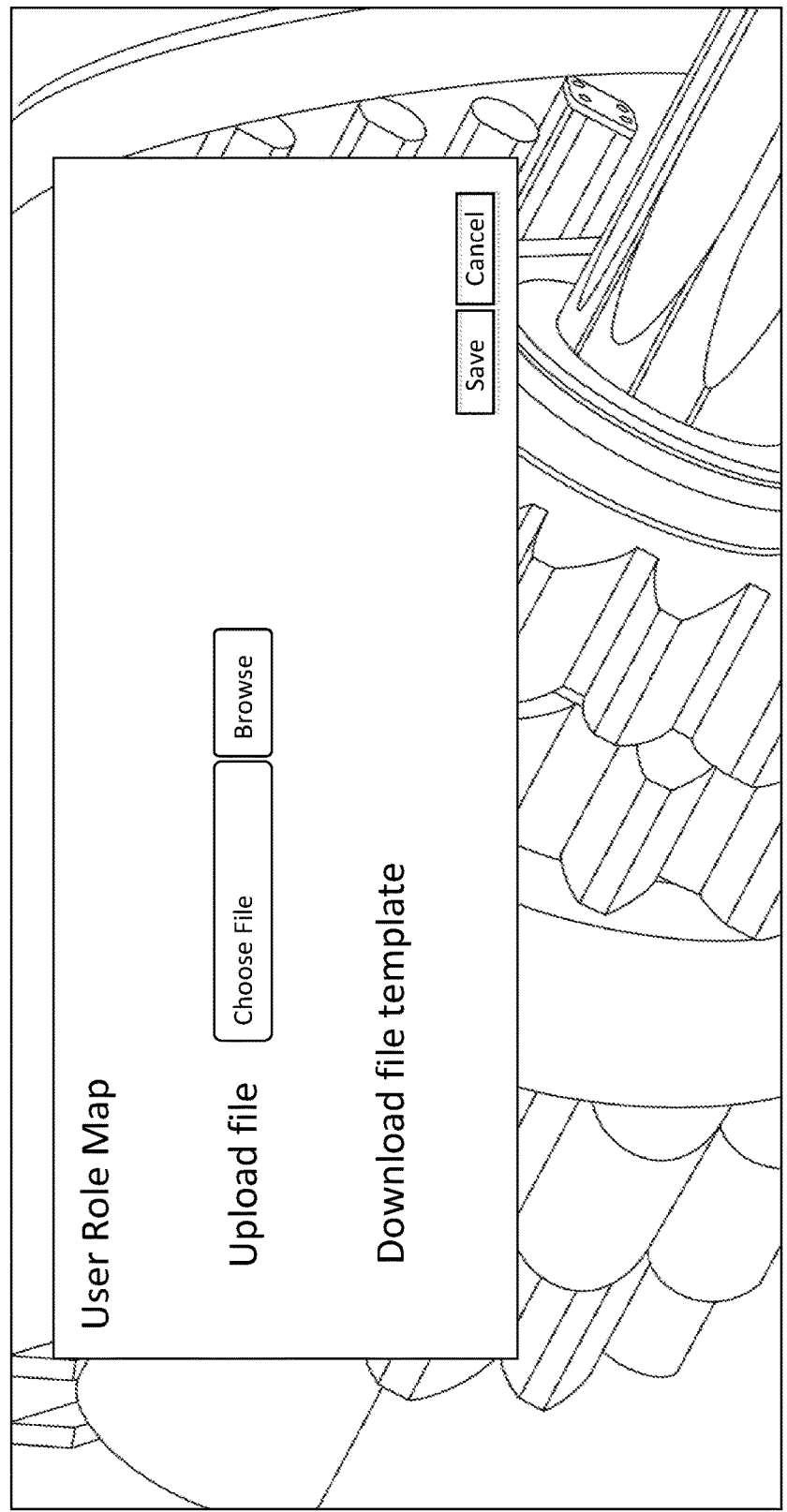
FIG. 14 is an illustration of an example UI for uploading user role map files.

FIG. 14 is an illustration of an example user interface 1400 for uploading user role map files that assign roles to users. The user role map files enable an administrator to configure the users for using the productivity modeling system 100. For example, the administrator may configure specific roles for users such as but not limited to an administrator, a presenter and the like and set privileges according to the configured roles.

Figure 15:
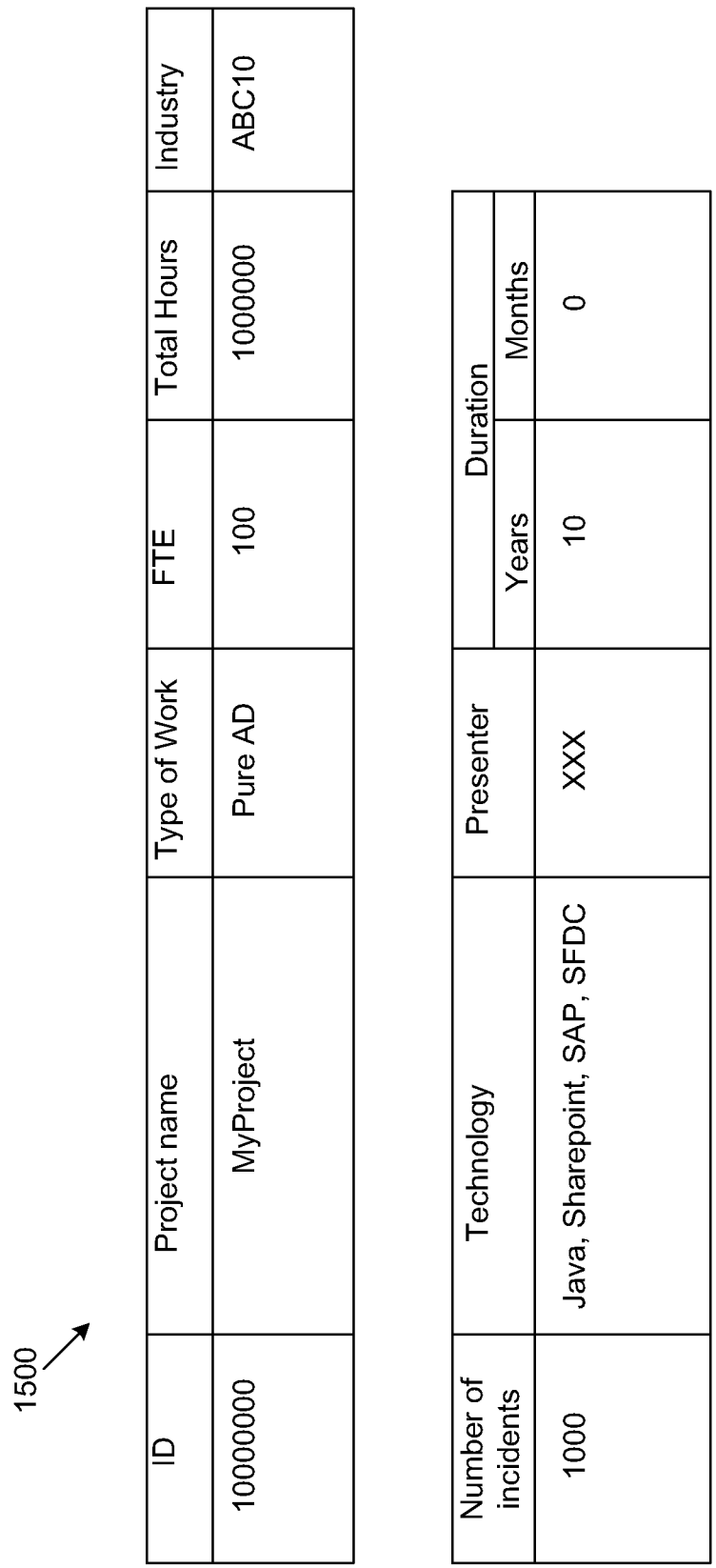
FIG. 15 shows a tabular form which provides one example of the information included in the productivity file.

FIG. 15 shows a tabular form 1500 which provides one example of the information included in the productivity file 104 that enables the generation of the productivity maturity model 130. The information provided in the template may include attributes of the project such as but not limited to, a unique ID and a name of the project, type of work involved, the FTE to be used, the total hours which are expected to be expended, the industry, the number of incidents, the technology associated with the project, the presenter and the duration of the project.

FIG. 16 shows example data from the productivity file 104 that enables generating the various productivity views. The table 1602 shows example data that enables generating the productivity levers view 408. Similarly the table 1604 shows example data for generating the various graphs used for the year-wise productivity view 404.

FIG. 17A shows some examples of the subset of the suggested actions 124 for increasing the productivity under the people competencies productivity lever 202. The level data in column 1702 indicates the productivity level associated with the corresponding action(s). Thus, when the first action from the column 1710 is included in the productivity maturity model 130 a productivity gain percentage associated with the 'basic' level may be added to the aggregated productivity gain percentage 504. The actions are added to columns 1704 or 1706 depending on the teams that will be executing the suggested actions. The sub-actions associated with the subset of suggested actions are shown in column 1708.

FIG. 17B shows some example suggested actions for increasing the productivity under the industrialization productivity lever 204. A few of the suggested actions have certain sub-actions defined under the column 1720. The sub-actions may pertain to one or both of the actions suggested for the two teams shown in columns 1712 and 1714.

FIG. 17C illustrates some examples of the suggested actions 124 that can contribute to the increase of productivity under the intelligence and automation productivity lever 206.

FIG. 17D shows some examples of the suggested actions 124 that can contribute to the productivity gains under the industry assets and capabilities lever 208. It can be appreciated that only a few suggested actions are shown for each productivity lever by the way of example and that numerous suggested actions may be typically included under each productivity lever to improve productivity.

Figure 18:
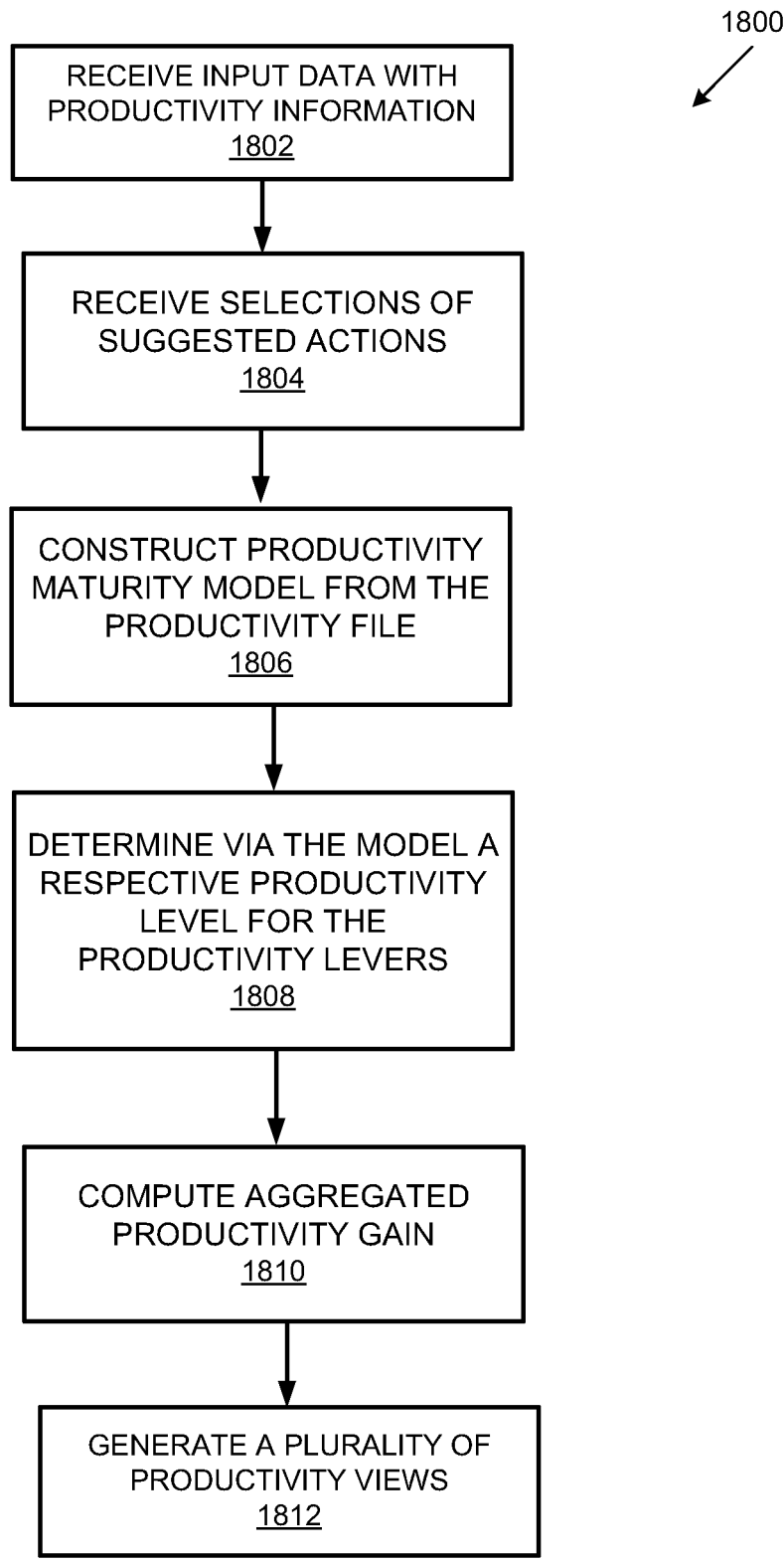
FIG. 18 is a flowchart that details a method of displaying productivity of an organization.

FIG. 18 is a flowchart 1800 that details a method of displaying productivity of an organization. The method begins at block 1802 wherein input data 122 including information regarding productivity of the organization such as the productivity file 104 is received. In one example, a user may upload the productivity file 104 which may include one or more spreadsheets with information regarding the various productivity levers 132 used within an organization for measuring productivity and the details of the suggested actions 124 for increasing productivity under each of the productivity levers 132. In an example, the suggested actions may include certain standard actions 222 that are included by default for each productivity lever. The productivity file 104 may also allow users to define customized actions for improving productivity for a given productivity lever. Accordingly at block 1804, selections of standard actions 222 and information regarding customized actions 224 that a user may define is received. In an example, the selection of suggested actions can include selections of the standard actions that were included by default in the productivity file 104. In an example, the user may be allowed to delete one or more standard actions to observe their effect on the productivity. The information regarding the customized actions 224 can include the description of the action, the parties who need to execute the action and a productivity level increase associated with the action. The productivity maturity model 130 is constructed from the productivity file 104 based on the selected suggested actions at block 1806. The productivity maturity model 130 provides a productivity gain that may be achieved by each of the productivity levers 132 upon the execution of the selected suggested actions. The productivity gains, for example, may be defined in terms of productivity maturity levels 134 associated with a range of productivity gains within the productivity maturity model 130. The productivity maturity model 130 therefore determines a productivity level 134 associated with each productivity lever 132 at block 1808. The productivity maturity model 130 may be configured to compute the aggregated productivity gain percentage 504 that may be achieved from the various productivity levers 132 at block 1810. A plurality of productivity views are generated at block 1812 to display the productivity information to the user via various infographics.

Figure 19:
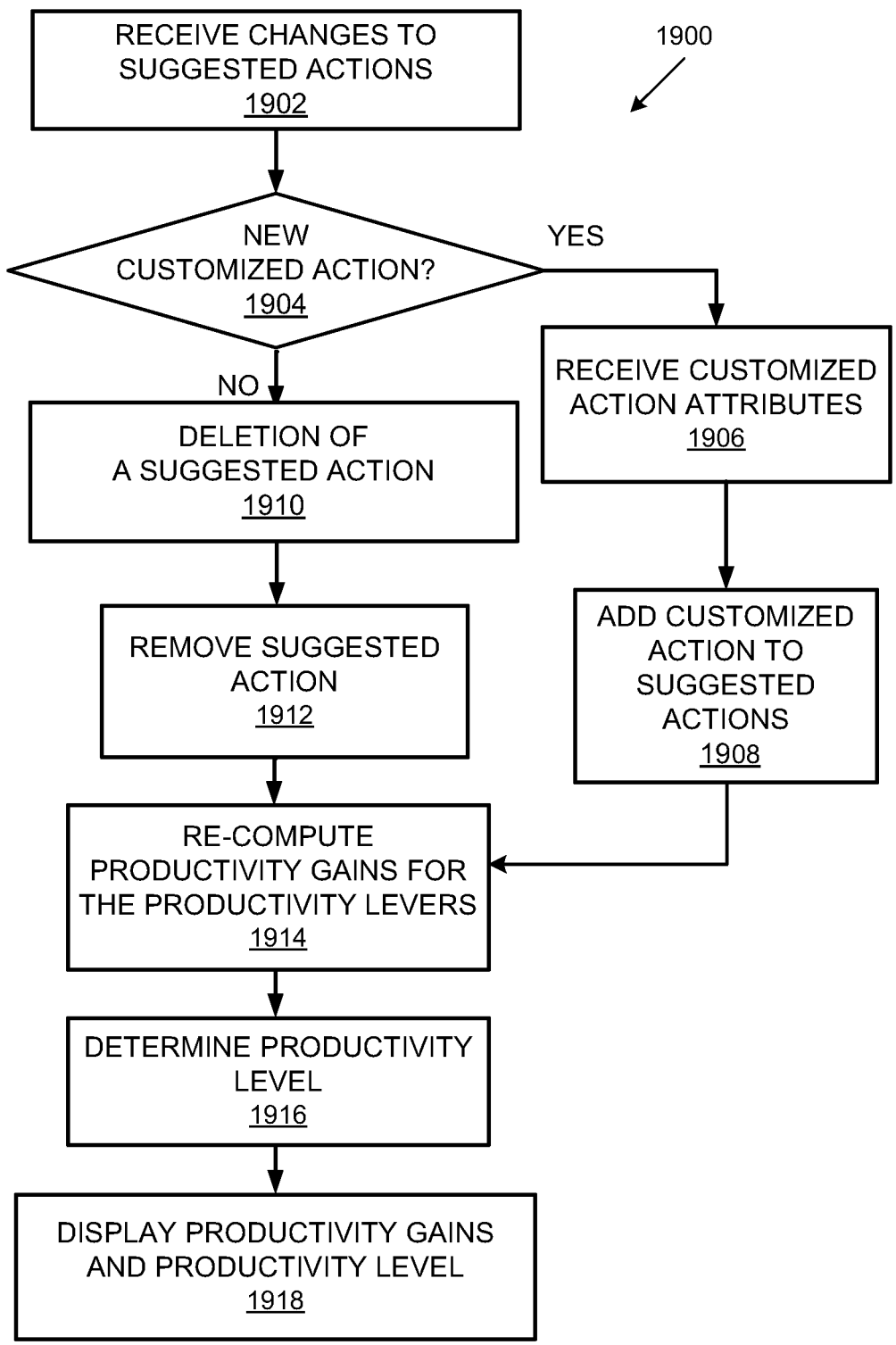
FIG. 19 is a flowchart that details an example method of generating 'what-if' scenarios by the simulation processor.

FIG. 19 is a flowchart 19000 that details an example method of generating 'what-if' scenarios by the simulation processor 306 using the productivity maturity model 130 for re-computing productivity estimates when changes are made to the suggested actions 124. A suggested action is associated with a respective productivity gain percentage which may be predetermined or preset so that when a party responsible for the suggested action executes the suggested action, the productivity of the organization increases by the respective predetermined gain percentage for the corresponding productivity lever associated with the suggested action. When one of the suggested actions 124 is removed or deleted from the project, the productivity gain is impacted negatively as the productivity gain associated with the deleted action needs to be removed from the aggregated productivity gain percentage and the total productivity gain percentage associated with the corresponding productivity lever. In an example, the productivity maturity model 130 may re-compute the productivity gains upon receiving user input for adding new customized actions or deleting one or more of the suggested actions 124 already included in the productivity file.

The method begins with the productivity maturity model 130 receiving information regarding changes made to the suggested actions 124, for example, via altering the productivity file 104 by the user at block 1902. Accordingly, it is determined at block 1904 if the changes include defining a new customized action. If a new customized action was defined by the user, the method proceeds to receiving attributes of the new customized action at block 1906 and to adding the new customized action to the suggested actions 124 at block 1908. The method then proceeds to block 1914 for re-computing the productivity gains resulting from the changes to the suggested actions and determining the productivity level at 1916. When a new customized action is defined, a positive productivity change or an increase in the productivity gain percentages is seen over a prior productivity estimate which may or may not result in the corresponding productivity lever 132 being associated with a higher productivity level 134.

If no new customized actions are defined at block 1904, the method may proceed directly to block 1910 to determine that the change at 1902 pertains to one or more of the suggested actions being de-selected or deleted via the simulation processor 306. If a user deems the cost of a suggested action as high or if a suggested action is considered redundant, the suggested action may be removed, for example, from the productivity file 104 at block 1912. At 1914, the productivity maturity model 130 re-computes the productivity gains associated with the productivity levers 132 affected by the changes to the suggested actions 124. In an example, one or more of the total productivity gain percentage of the productivity levers associated with the newly added or the deleted suggested actions and the aggregated productivity gain percentage are recomputed at 1914. In the case of deletion of a suggested action, the productivity gains will be negative in that the productivity gain after deletion of the suggested action will be less than the productivity gains prior to the deletion of the suggested action as the productivity gains such as the total productivity gain percentage of an associated productivity lever or the aggregated productivity gain percentage are re-computed by subtracting the predetermined productivity gain percentage of the deleted action from the prior values of the total productivity gain percentage or the aggregated productivity gain percentage. At 1916, a productivity level associated with the productivity gain of the corresponding productivity lever is determined. The productivity level associated with the corresponding productivity lever may be reduced. One or more of the productivity levels and the productivity gain percentages are displayed to the user at 1918, for example, via one of the views generated by the illustrator 302.

Figure 20:
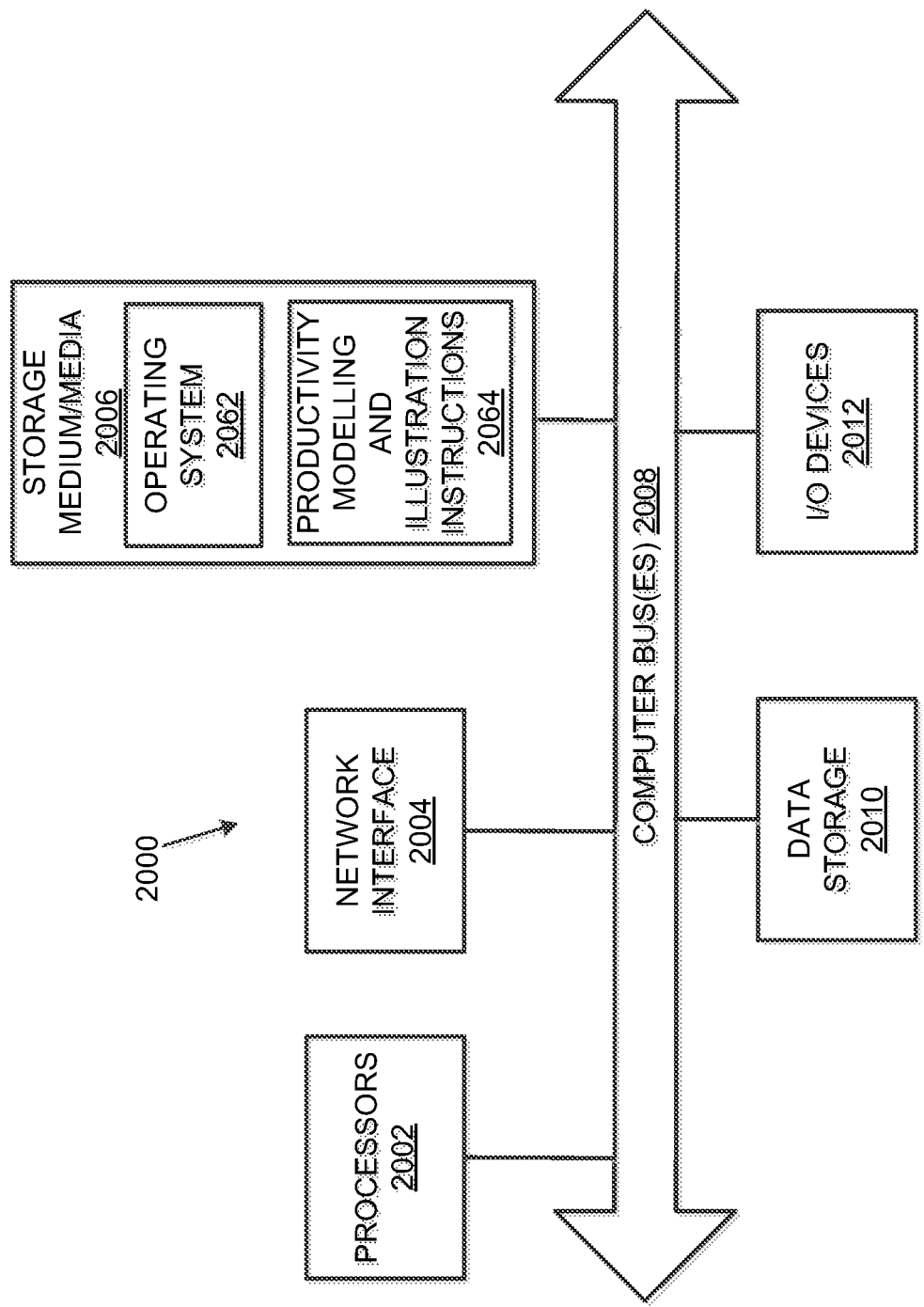
FIG. 20 illustrates a computer system that may be used to implement a productivity measurement, modeling and illustration system.

FIG. 20 illustrates a computer system 2000 that may be used to implement the productivity measurement, modeling and illustration system 100. More particularly, computing machines such as desktops, laptops, smartphones, tablets, wearables which may be used to receive, process and illustrate productivity information may have the structure of the computer system 2000. The computer system 2000 may include additional components not shown and that some of the components described may be removed and/or modified.

The computer system 2000 includes processor(s) 2002, such as a central processing unit, ASIC (Application-Specific Integrated Circuit) or other type of processing circuit, input/output devices 2012, such as a display, mouse keyboard, etc., a network interface 2004, such as a Local Area Network (LAN), a wireless 2002.11x LAN, a 3G or 4G mobile WAN or a WiMax WAN, and a computer-readable storage medium 2006. Each of these components may be operatively coupled to a bus 2008. The computer readable storage medium 2006 may be any suitable medium such as the non-transitory data storage 154 which participates in providing instructions to the processor(s) 2002 or the processor 152 for execution. For example, the computer readable storage medium 2006 may be non-transitory or non-volatile computer-readable storage medium, such as a magnetic disk or solid-state non-volatile memory or volatile medium such as RAM. The instructions or modules stored on the computer readable storage medium 2006 may include machine readable instructions 2064 executed by the processor(s) 2002 to perform the methods and functions for receiving, processing and displaying the productivity information of the organization. The computer readable storage medium 2006 may also store an operating system 2062, such as MAC OS, MS WINDOWS, UNIX, or LINUX. The operating system 2062 may be multi-user, multiprocessing, multitasking, multithreading, real-time and the like. For example, during runtime, the operating system 2062 is running and the instructions 2064 are executed by the processor(s) 2002 for implementing the productivity modeling system 100 discussed herein. The instructions may include instructions for generating the productivity maturity model 130, instructions for computing the aggregated productivity percentages and percentage changes and instructions for generating the various productivity views.

The computer system 2000 may include a data storage 2010, which may include non-volatile data storage. The data storage 2010 stores any data used by the productivity modeling system 100. The data storage 2010 may be used to store the productivity files, reports, settings and other information required for the smooth operation of the productivity modeling system 100.

The network interface 2004 connects the computer system 2000 to internal systems for example, via a LAN. Also, the network interface 2004 may connect the computer system 2000 to the Internet. For example, the computer system 2000 may connect to web browsers and other external applications and systems via the network interface 2004 for cross-platform support that allows access to the productivity modeling system 100 via the myriad client devices or end-user devices that are currently in use.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A productivity measurement, modeling and illustration system comprising:
    at least one processor; and
    a non-transitory data storage comprising machine readable instructions that cause the at least one processor to:
        receive via a configurable interface, input data from a plurality of productivity tools, the plurality of productivity tools including a first computing system, in different data formats, the input data comprising a productivity file located on the first computing system and including suggested actions for a plurality of productivity categories associated with industrialization, intelligence and automation aspects of an organization,
            where, for each of the suggested actions, if a productivity gain associated with a current productivity level changes beyond a range of the current productivity level, a succeeding productivity level with an adjusted range is automatically selected for an associated one of the plurality of productivity categories; each suggested action is estimated to change productivity of the organization by a respective predetermined productivity gain percentage for at least one of the plurality of productivity categories,
            the plurality of productivity categories are monitored with the plurality of productivity tools including the first computing system,
            where the suggested actions include at least one customized action pertaining to a particular one of the plurality of productivity categories and including a user-defined information item and an associated attribute value, where the at least one customized action automatically generates a plan for the first computing system and a second computing system and automatically performs test and defect management for the first computing system and the second computing system;
        construct a productivity maturity model from the input data and the suggested actions,
            where the productivity maturity model assigns one of a plurality of productivity levels to each productivity category of the plurality of productivity categories based on the suggested actions for the respective productivity category and indicates a length of time productivity has been monitored in each of the plurality of productivity categories;
        compute an aggregated productivity gain percentage based on a respective total productivity gain percentage obtained from predetermined productivity gain percentages of the suggested actions for each of the plurality of productivity categories;
        generate, via a user interface (UI) generator, a first UI based on a first format for the first computing system and a second UI based on a second format for the second computing system to display views of productivity numbers generated by the productivity maturity model;
        generate a plurality of productivity views for display on the second computing system that comprise at least a summary view from the productivity file located on the first computing system,
            where the summary view displays productivity information and the aggregated
            productivity gain percentage during different time periods;
        receive, via edits to the productivity file, information regarding the at least one customized action,
            where the at least one customized action changes a total productivity gain
            percentage of an associated productivity category of the plurality of productivity categories; and
        alter a position of at least one UI element on the summary view, where the position of the at least one UI element is altered from one productivity level to another productivity level indicating a change in the total productivity gain percentage of the associated productivity category.

2. The system of claim 1, where the instructions to generate a plurality of productivity views further comprises instructions that cause the processor to:
    include in the summary view, the productivity information comprising the total productivity gain percentage and a productivity level for each of the plurality of productivity categories;
    generate a year-wise productivity view to display year-wise aggregated productivity gain percentages associated with the plurality of productivity categories; and
    generate a bundle view comprising an application bundle view and a technology bundle view, the application bundle view displaying a number of applications associated with each department or division of the organization and productivity gains in terms of percentages achieved within the division, and the technology bundle view displaying productivity gains contributed by a plurality of technologies;

generate a productivity category view to display a total productivity gain percentage for each of the plurality of productivity categories.

3. The system of claim 1, further comprising instructions that cause the processor to:

generate a user interface for a fulfilment monitor to provide historical data for productivity gains realized over time upon implementing the suggested actions.

4. The system of claim 1, where the instructions to construct the productivity maturity model comprise instructions that cause the processor to:

configure the productivity maturity model to:
 identify respective subsets of the suggested actions corresponding to each of the productivity categories; and
 determine a total productivity gain percentage for each of the productivity categories based on a respective predetermined productivity gain percentages of respective subsets of the suggested actions.

5. The system of claim 4, where the instructions to construct the productivity maturity model comprise instructions that cause the processor to:

enable the productivity maturity model to determine one of the plurality of productivity levels for each of the plurality of productivity categories based on a respective range of the total productivity gain percentage of each productivity category.

6. The system of claim 1, where the instructions to receive input data via the configurable interface further comprise instructions that cause the processor to:

receive the productivity file,
 where the productivity file includes data regarding the plurality of productivity categories, and
 where the suggested actions correspond to at least a subset of the plurality of productivity categories and the respective predetermined productivity gain percentage associated with each of the suggested actions, and
 further where the suggested actions comprise standard actions that are not editable by a user and the at least one customized action, where the at least one customized action is editable by the user.

7. The system of claim 6, where the instructions to receive selections of suggested actions further comprise instructions that cause the processor to:

identify a respective subset of the suggested actions corresponding to each of the subset of the plurality of productivity categories.

8. The system of claim 6, where the instructions to receive the information regarding the at least one customized action further comprise instructions that cause the processor to:

receive information regarding the at least one customized action, the information regarding the at least one customized action includes a definition of the at least one customized action, a respective predetermined productivity gain percentage for the at least one customized action, the associated productivity category of the plurality of productivity categories and at least one party responsible for executing the at least one customized action; and add the at least one customized action to the suggested actions.

9. The system of claim 8, further comprising instructions that cause the processor to:

re-compute the total productivity gain percentage and the productivity level for the productivity category associated with the at least one customized action to include the respective predetermined productivity gain percentage for the at least one customized action; and re-compute the aggregated productivity gain percentage to include the respective predetermined productivity gain percentage for the at least one customized action.

10. The system of claim 6, wherein the instructions to receive, via edits to the productivity file, information regarding the at least one customized action further comprise instructions that cause the processor to:

receive information regarding deletion of one or more of the suggested actions; and remove the one or more suggested actions from the productivity file.

11. The system of claim 10, further comprising instructions that cause the processor to:

re-compute the total productivity gain percentage by removing the respective predetermined productivity gain percentages of the one or more suggested actions; and re-compute the aggregated productivity gain percentage by deleting the respective predetermined productivity gain percentages of the one or more suggested actions from a prior value of the aggregated productivity gain percentage.

12. The system of claim 10, further comprising instructions that cause the processor to:

generate a user interface for a simulation processor that enables deleting one or more of the suggested actions.

13. A method for productivity measurement comprising:

receiving, by a processor via a configurable interface, input data from a plurality of productivity tools, the plurality of productivity tools including a first computing system, in different data formats, the input data comprising a productivity file located on the first computing system and including at least suggested actions for a plurality of productivity categories associated with automation of an organization, the suggested actions for increasing productivity of the organization, the suggested actions comprising standard actions that are included by default, and customized actions that are defined by users, and each of the standard actions contributes a predetermined productivity gain percentage estimated to increase productivity of a corresponding productivity category of the plurality of productivity categories;

constructing, by the processor, a productivity maturity model based on the suggested actions, where the productivity maturity model provides a productivity level for each of the plurality of productivity categories, where constructing the productivity model comprises, for each of the suggested actions, if a productivity gain associated with a current productivity level changes beyond a range of the current productivity level, a succeeding productivity level with an adjusted range is automatically selected for an associated one of the plurality of productivity categories;

receiving, by the processor via edits to the productivity file, information regarding at least one of the customized actions that include changes to the suggested actions where the at least one customized action pertains to a particular productivity category and includes a user-defined information item and an associated attribute value, and changes a total productivity gain percentage of an associated productivity category of the plurality of productivity categories, the at least one customized action automatically generating a plan for the first computing system and a second computing system and automatically performing test and defect management for the first computing system and the second computing system;

determining, by the processor, if the changes to the suggested actions comprise defining a new customized action or deletion of one or more of the suggested actions;

obtaining, by the processor, changes to respective total productivity gain percentages of one or more of the productivity categories corresponding to the changes to the suggested actions;

determining, by the processor, changes to productivity levels for the productivity categories corresponding to the changes to the suggested actions; and generating, via a user interface (UI) generator, a first UI based on a first format for the first computing system and a second UI based on a second format for the second computing system to display views of productivity numbers generated by the productivity maturity model;

enabling, by the processor, a display of the changes to respective total productivity gain percentages and the changes to productivity levels for the productivity categories for display on the second computing system via altering a position of at least one UI element on a summary view generated from the productivity file, where the position of the at least one UI element is altered from one productivity level to another productivity level indicating a change in the total productivity gain percentage of the associated productivity category.

14. The method of claim 13, where determining if the changes comprise defining a new customized action or deletion of one or more of the suggested actions further comprises:

determining, by the processor, the changes to the suggested actions comprise deletion of at least one of the suggested actions; and removing, by the processor, the at least one of the suggested actions from a productivity file.

15. The method of claim 13, where obtaining changes to productivity gains of one or more of the productivity categories, further comprises:

re-computing, by the processor, a total productivity gain percentage for at least one productivity category upon the removing of the at least one of the suggested actions.

16. The method of claim 13, where determining if the changes comprise defining a new customized action or deletion of one or more of the suggested actions further comprises:

determining, by the processor, the changes comprise defining a new customized action;

receiving, by the processor, attributes of the new customized action, the attributes comprising the corresponding productivity category; and adding, by the processor, the new customized action to the suggested actions.

17. The method of claim 16, where obtaining changes to productivity gains of one or more of the productivity categories, further comprises:

re-computing, by the processor, a total productivity gain percentage for the corresponding productivity category upon the addition of the new customized action.

18. A non-transitory computer-readable storage medium comprising machine-readable instructions that cause a processor to:

receive input data from a plurality of productivity tools, the plurality of productivity tools including a first computing system, in different data formats, the input data includes a productivity file located on the first computing system and comprising at least suggested actions for a plurality of productivity categories associated with automation of an organization, where each suggested action is estimated to improve productivity by a predetermined productivity gain percentage under one of the plurality of productivity categories, and the suggested actions include at least one customized action, where the at least one customized action automatically generates a plan for the first computing system and a second computing system and automatically performs test and defect management for the first computing system and the second computing system;

construct a productivity maturity model from the input data and the suggested actions, where the productivity maturity model determines one of a plurality of productivity levels for each productivity category of the plurality of productivity categories based on the suggested actions for the respective productivity category, and for each of the suggested actions, if a productivity gain associated with a current productivity level changes beyond the range of the current productivity level, a succeeding productivity level with an adjusted range is automatically selected for an associated one of the plurality of productivity categories;

compute an aggregated productivity gain percentage based on the productivity maturity model and a respective total productivity gain percentage obtained from productivity gain percentages of the suggested actions for each of the plurality of productivity categories;

generate, via a user interface (UI) generator, a first UI based on a first format for the first computing system and a second UI based on a second format for the second computing system to display views of productivity numbers generated by the productivity maturity model;

generate a plurality of productivity views for display on the second computing system that comprise at least a summary view, where the summary view displays productivity information and an aggregated productivity gain percentage of the plurality of productivity categories;

receive, via edits to the productivity file, information regarding the at least one customized action, where the at least one customized action pertains to a particular productivity category, includes a user-defined information item and an associated attribute value and changes a total productivity gain percentage of an associated productivity category of the plurality of productivity categories; and alter a position of at least one UI element on the summary view, where the position of the at least one UI element is altered from one productivity level to another productivity level indicating a change in the total productivity gain percentage of the associated productivity category.

19. The non-transitory computer-readable storage medium of claim 18 comprising further machine-readable instructions that cause the processor to:
receive the productivity file,
where the productivity file includes data regarding the plurality of productivity categories, and
where the suggested actions correspond to at least a subset of the plurality of productivity categories and a predetermined productivity gain percentage associated with each of the suggested actions.

20. The non-transitory computer-readable storage medium of claim 18 wherein the machine-readable instructions to construct the productivity maturity model comprising further machine-readable instructions that cause the processor to:
configure the productivity maturity model to:
identify respective subsets of the suggested actions corresponding to each of the plurality of productivity categories; and
determine a total productivity gain percentage for each of the plurality of productivity categories based on the respective subsets of the suggested actions.

* * * * *